(12) United States Patent
Balk

(10) Patent No.: US 8,042,676 B2
(45) Date of Patent: Oct. 25, 2011

(54) BUFFER CONVEYOR FOR CONVEYING AND BUFFERING PRODUCTS

(75) Inventor: Wouter Balk, Baambrugge (NL)

(73) Assignee: Specialty Conveyor B.V., Zwaag (NL)

(*) Notice: Subject to any disclaimer, the term of this patent is extended or adjusted under 35 U.S.C. 154(b) by 181 days.

(21) Appl. No.: 12/257,629

(22) Filed: Oct. 24, 2008

(65) Prior Publication Data

US 2009/0050445 A1    Feb. 26, 2009

Related U.S. Application Data

(63) Continuation-in-part of application No. PCT/NL2007/050174, filed on Apr. 20, 2007.

(30) Foreign Application Priority Data

Apr. 24, 2006  (EP) .................................... 06112987
Nov. 20, 2006  (NL) .................................... 2000319

(51) Int. Cl.
*B65G 47/26* (2006.01)
(52) U.S. Cl. ............... 198/347.1; 198/347.4; 198/347.3; 198/444; 198/778
(58) Field of Classification Search .................. None
See application file for complete search history.

(56) References Cited

U.S. PATENT DOCUMENTS

| | | | |
|---|---|---|---|
| 3,318,439 A | 5/1967 | Sullivan | |
| 4,018,325 A | 4/1977 | Rejsa | |
| 4,063,632 A | 12/1977 | Neth et al. | |
| 4,201,286 A | 5/1980 | Meier | |
| 4,364,465 A | 12/1982 | Kraft et al. | |
| 4,401,020 A | 8/1983 | Brux | |
| 4,413,724 A | 11/1983 | Fellner | |
| 4,469,219 A | 9/1984 | Cosse | |
| 4,513,858 A | 4/1985 | Fellner | |
| 4,549,647 A | 10/1985 | Cosse | |
| 4,718,656 A | 1/1988 | Reist | |
| 4,889,223 A | 12/1989 | Bergstrom | |

(Continued)

FOREIGN PATENT DOCUMENTS

DE    1262886    3/1968

(Continued)

OTHER PUBLICATIONS

Written opinion of the European Patent Office in counterpart foreign application No. PCT/NL2007/050174 filed Apr. 20, 2007.

(Continued)

*Primary Examiner* — Kavel Singh
(74) *Attorney, Agent, or Firm* — Steven M. Koehler; Westman, Champlin & Kelly P.A.

(57) ABSTRACT

A buffer conveyor for conveying and buffering products comprises a first elongated conveyor and a second elongated conveyor that can be driven in an opposite direction. The first and the second conveyor extend in a path at least substantially parallel to each other and beside each other. A transfer unit is movable at least substantially parallel to the first and the second conveyor in the aforesaid path and is provided with a transfer device for transferring the products from the first conveyor to the second conveyor. The transfer unit comprises a drive unit for moving the transfer unit, preferably in dependence on the velocities of the first and the second conveyor. The drive unit of the transfer unit comprises a drive motor, which follows the movements of the transfer unit at least in part.

17 Claims, 19 Drawing Sheets

U.S. PATENT DOCUMENTS

| | | | | |
|---|---|---|---|---|
| 4,924,998 | A | * | 5/1990 | Fuller, Jr. .................. 198/370.04 |
| 4,944,315 | A | | 7/1990 | Focke |
| 4,989,718 | A | | 2/1991 | Steeber |
| 5,067,857 | A | | 11/1991 | Ward |
| 5,350,050 | A | | 9/1994 | Franke |
| 5,413,213 | A | | 5/1995 | Golz et al. |
| 5,417,317 | A | | 5/1995 | Kalinich |
| 5,490,589 | A | | 2/1996 | Golz |
| 5,636,723 | A | | 6/1997 | Bulle et al. |
| 5,690,463 | A | | 11/1997 | Yoshie |
| 5,772,005 | A | | 6/1998 | Hansch |
| 5,845,765 | A | * | 12/1998 | Gram ............................ 198/778 |
| 5,903,464 | A | | 5/1999 | Stingel, Jr. et al. |
| 6,026,947 | A | | 2/2000 | Peterson |
| 6,152,291 | A | | 11/2000 | Steeber |
| 6,182,812 | B1 | | 2/2001 | Hartness, III et al. |
| 6,230,874 | B1 | | 5/2001 | Steeber et al. |
| 6,241,074 | B1 | | 6/2001 | Steeber |
| 6,260,688 | B1 | | 7/2001 | Steeber |
| 6,334,528 | B1 | | 1/2002 | Bogle et al. |
| 6,533,103 | B2 | | 3/2003 | Hartness et al. |
| 6,612,420 | B1 | * | 9/2003 | Hartness et al. ............. 198/597 |
| 2003/0111319 | A1 | | 6/2003 | Steeber |
| 2003/0165600 | A1 | * | 9/2003 | Shefet et al. .................. 426/315 |
| 2003/0209409 | A1 | * | 11/2003 | Horton et al. .................. 198/594 |

FOREIGN PATENT DOCUMENTS

| | | |
|---|---|---|
| DE | 2307728 | 9/1974 |
| DE | 2618905 | 11/1977 |
| DE | 202004016069 | 3/1990 |
| EP | 0635414 A1 | 1/1995 |
| EP | 0259650 A3 | 3/1998 |
| FR | 2218191 | 2/1974 |
| FR | 2766803 | 2/1999 |
| JP | 59053315 | 3/1984 |

OTHER PUBLICATIONS

Official Search Report of the European Patent Office in counterpart foreign application No. PCT/NL2007/050174 filed Apr. 20, 2007.

International Search Report for International Application No. PCT/US00/12958, filed May 12, 2000, entitled "Device for Transferring Articles Between Oppositely Running Conveyors".

* cited by examiner

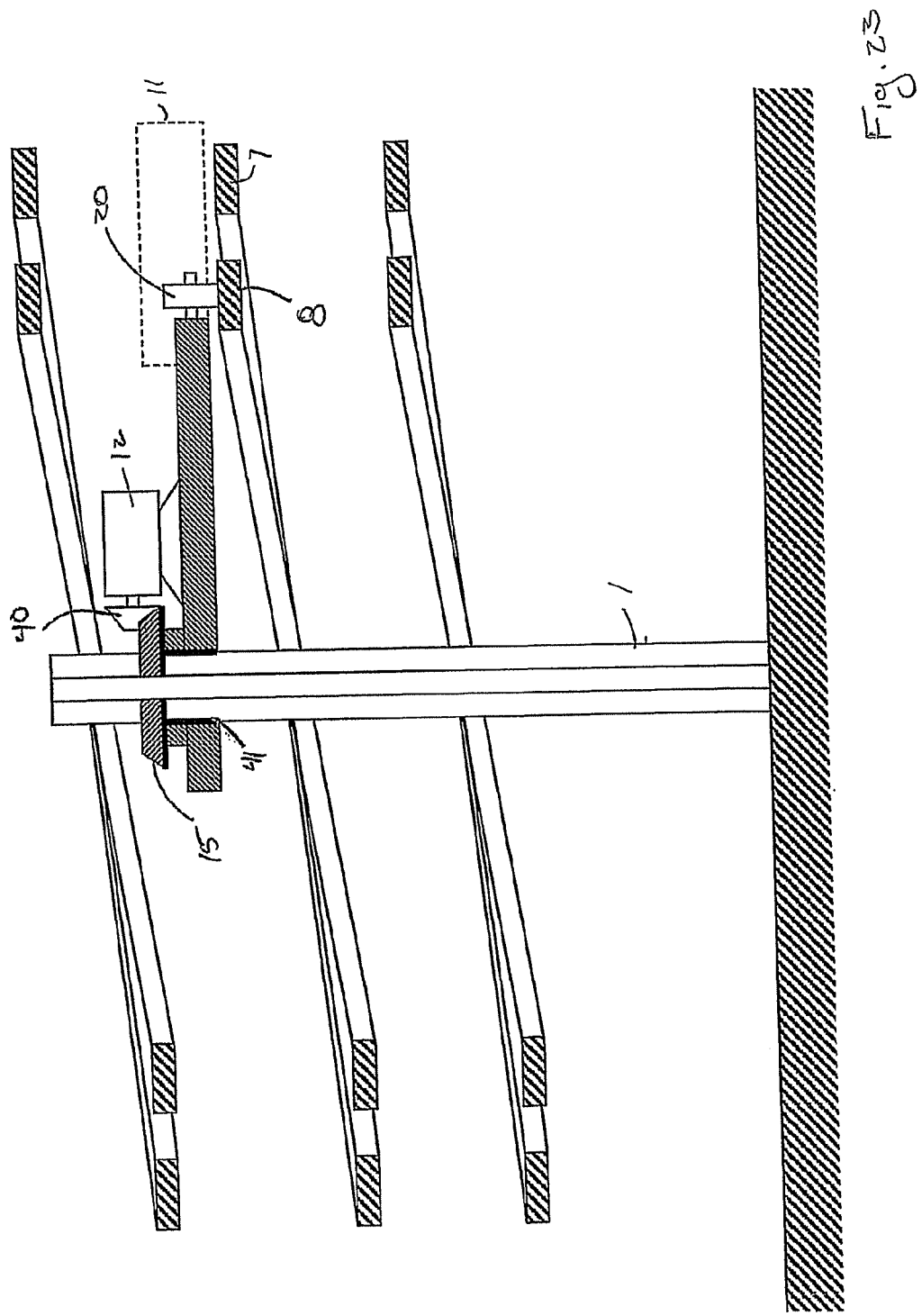

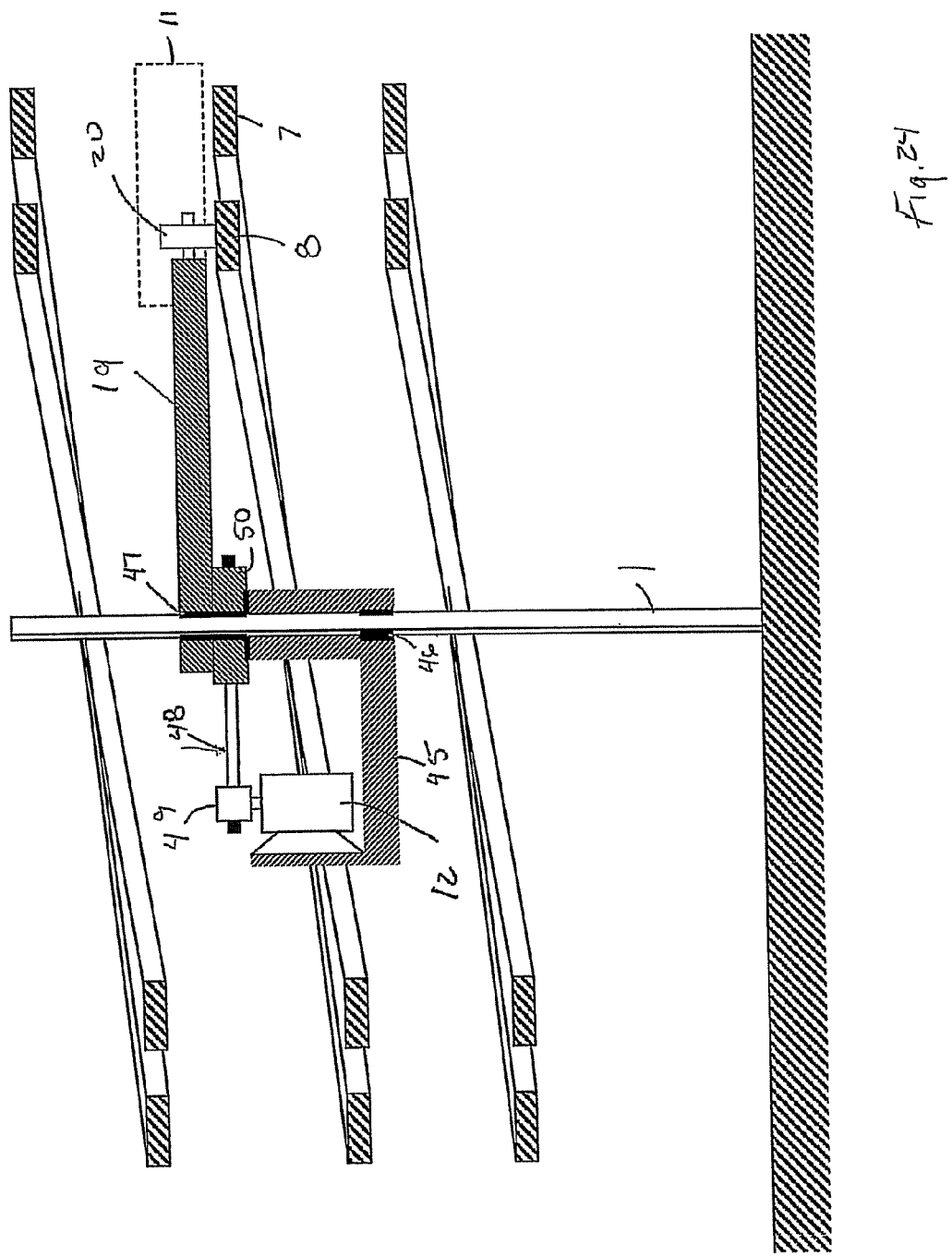

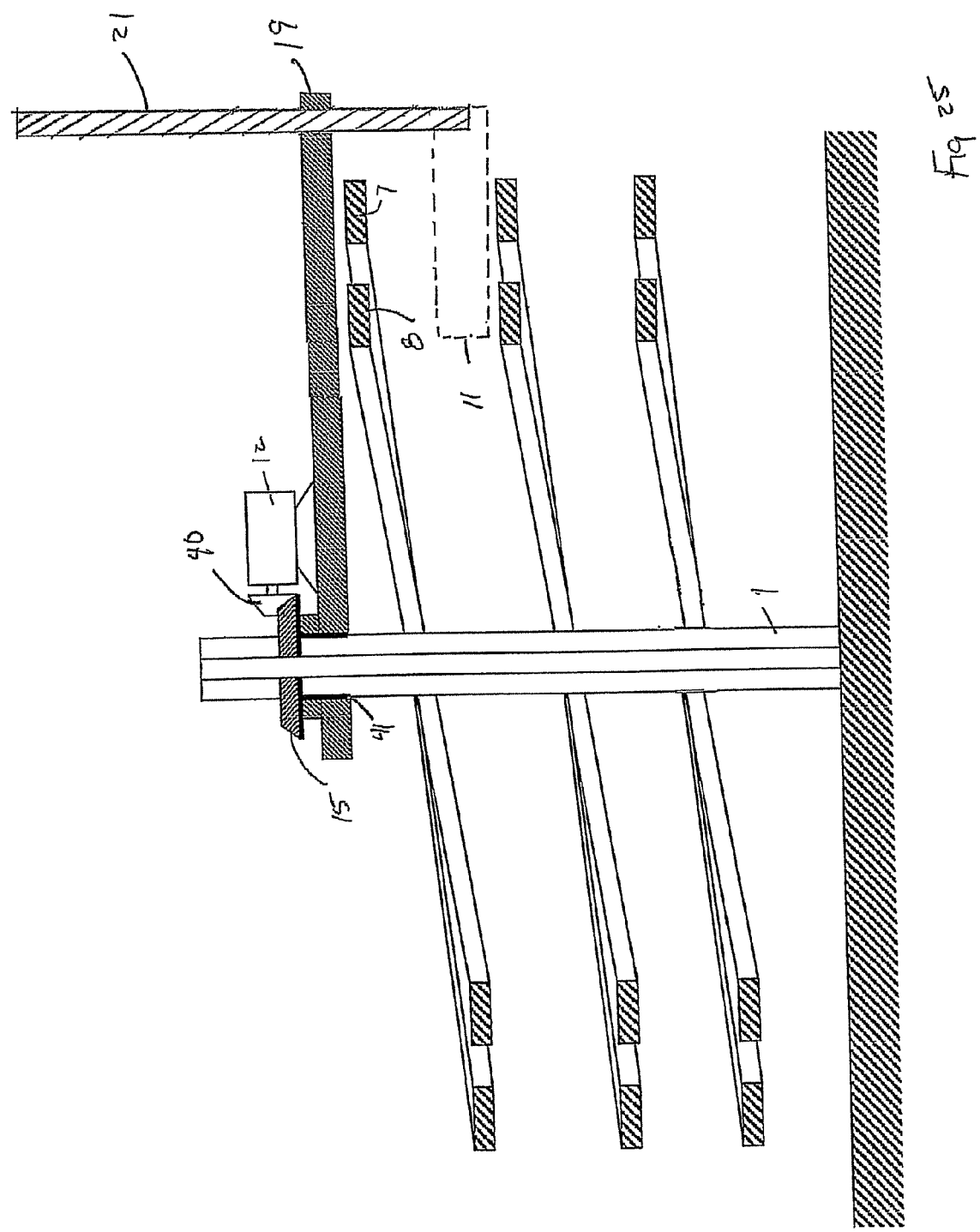

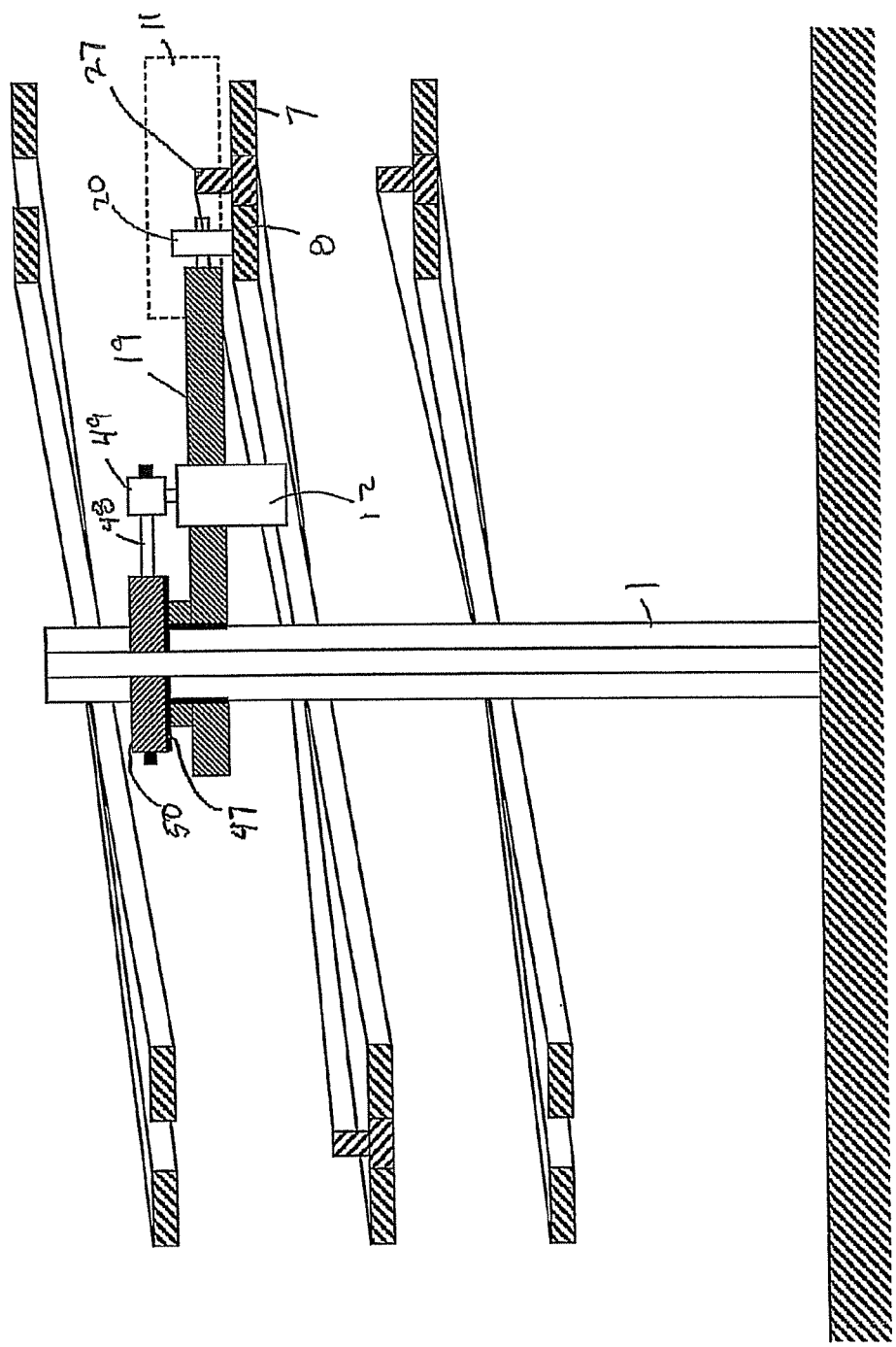

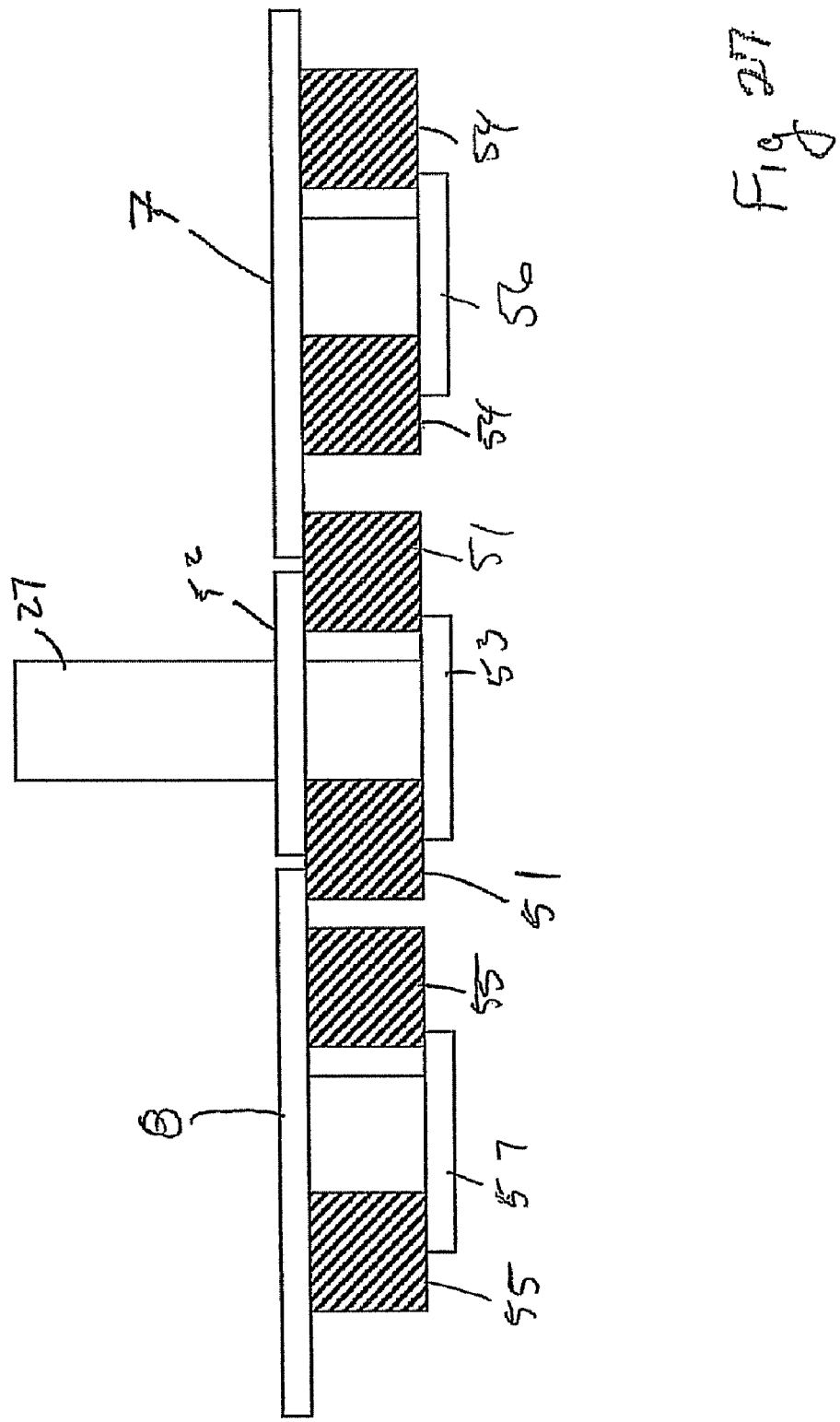

BUFFER CONVEYOR FOR CONVEYING AND BUFFERING PRODUCTS

CROSS-REFERENCE TO RELATED APPLICATION

The present application is a continuation-in-part of and claims priority under 35 USC §120 of International patent application Serial No. PCT/NL2007/050174, filed Apr. 20, 2007, and published as WO 2007/123401 in English.

BACKGROUND

The invention relates to a buffer conveyor for conveying and buffering products, such as parcel goods being conveyed one at a time, in particular boxes, crates, beverage cartons and the like, as well as mass flow goods such as bottles, cans and the like. Such a buffer conveyor comprises at least one first elongated conveyor, which can be driven in a first direction and which has a supply end, a second elongated conveyor, which can be driven in a second, opposite direction and which has a discharge end, which first and second conveyors extend in a path at least substantially parallel to each other and beside each other, a transfer unit, which is movable at least substantially parallel to the first and the second conveyor in the aforesaid path and which is provided with a transfer device for transferring the products from the first conveyor to the second conveyor, which transfer unit comprises a drive unit for driving the transfer unit, preferably in dependence on the velocities of the first and second conveyors.

Such transfer units are known in many embodiments thereof. Several ways of driving the transfer unit are possible. On the one hand buffer conveyors are known in which the transfer unit does not have its own drive unit, but in which the transfer unit is connected to the (drive unit(s) of the) first and second conveyors via a differential, so that the transfer unit is driven by the first and the second conveyor at a velocity dependent on the conveying velocity of said conveyors. Furthermore, buffer conveyors are known in which the transfer unit is driven by a stationary drive motor, which is connected to and drives the transfer unit via a connecting element, such as an endless driving element.

SUMMARY

This Summary and Abstract are provided to introduce some concepts in a simplified form that are further described below in the Detailed Description. This Summary and Abstract are not intended to identify key features or essential features of the claimed subject matter, nor are they intended to be used as an aid in determining the scope of the claimed subject matter. In addition, the description herein provided and the claimed subject matter should not be interpreted as being directed to addressing any of the short-comings discussed in the Background.

An aspect of the present invention is to provide a buffer conveyor embodying a new manner of driving the transfer unit.

In order to accomplish that aspect, the buffer conveyor includes a drive unit of the transfer unit that comprises a drive motor, which follows the movements of the transfer unit at least partly.

The advantage of configuring the transfer unit with its own drive motor is that this leads to a greater freedom in driving the transfer unit, in contrast to a mechanical differential, in which the transmission ratios are fixed. Since the drive motor follows the movements of the transfer unit at least partly, less stringent requirements may be made of the transmission between the drive motor and the transfer unit. Accordingly, the invention leads to a simple, cost-advantageous and reliable buffer conveyor.

A transmission can be left out altogether if the drive motor is mounted to a mounting element that moves along with the transfer unit, in which case the drive motor may be completely integral with the transfer unit if the mounting element is mounted on or to the transfer unit.

In that case the drive unit preferably comprises a transmission which is in driving engagement with the drive motor on the one hand and with either the frame or the first and/or the second conveyor on the other hand. Said engagement may be effected by means of friction or via gears, for example, with gears of the drive motor engaging a stationary ring gear, but it is also possible to drive the transfer unit through engagement with the adjacent first and/or second conveyor.

In a variant of the buffer conveyor, in which the conveying path winds around a vertical axis, it is possible to use an arm which is rotatably connected to a central column at one end and which is connected to the transfer unit at the other end for driving the transfer unit. The drive motor may be mounted in or to the arm in that case or be connected thereto for driving and at least partially following the movements of the arm.

If the conveyor path extends non-concentrically relative to the column, for example in an oval or a horizontal spiral (volute) configuration, the arm is preferably provided with means for adapting the arm to the varying distance between the transfer unit and the column.

If said path is curved not only in the horizontal plane but also extends at least partially in vertical direction, it is preferred that the drive motor in any case follows the vertical movement of the transfer unit.

The drive motor, which moves along with the transfer unit at least in part, may be connected to an energy source that moves along with the transfer unit, for example a battery, or to a stationary energy source via sliding contacts, cables that move along with the transfer unit or the like. Data communication between a stationary control unit and a control unit on the transfer unit may take place via a radio signal or through induction, for example.

If the drive unit of the transfer unit operates independently of the velocities of the first and the second conveyor, the buffer conveyor is preferably provided with sensors for measuring said velocities and with a control unit for controlling the drive unit of the transfer unit on the basis of the measured velocities. Said sensors may be disposed at a stationary location, but they may also be connected to the transfer unit, in which case the velocities of the first and the second conveyor in relation to that of the transfer unit are measured.

BRIEF DESCRIPTION OF THE DRAWINGS

Aspects of the invention will now be explained in more detail with reference to the drawings, in which a number of embodiments of the buffer conveyor are shown very schematically.

FIG. 23 is a cross-sectional schematic view of the embodiment illustrated in FIG. 4.

FIG. 24 is a cross-sectional schematic view of the embodiment illustrated in FIG. 5.

FIG. 25 is a cross-sectional schematic view of the embodiment illustrated in FIG. 5A.

FIG. 26 is a cross-sectional schematic view of the embodiment illustrated in FIG. 12.

FIG. 27 is a cross-sectional schematic view of the conveyor illustrated in FIG. 12.

DETAILED DESCRIPTION OF THE ILLUSTRATIVE EMBODIMENTS

Figure 1:
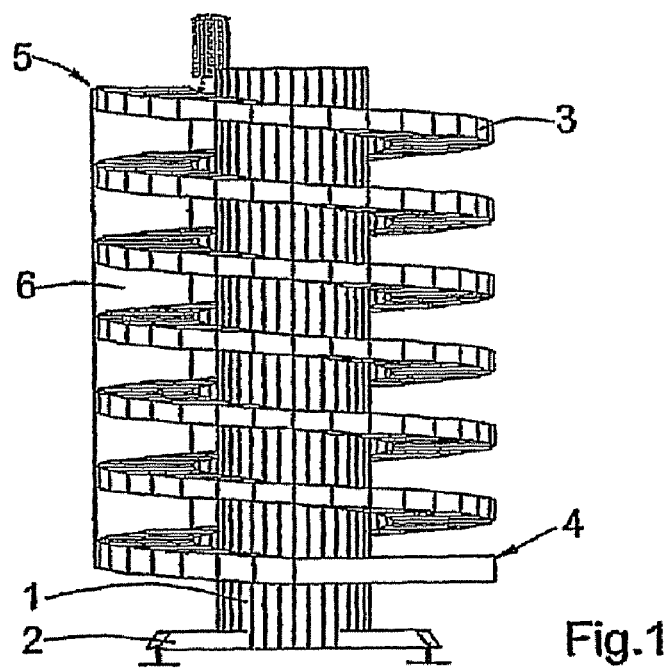
FIG. 1 is a very schematic side view of a first embodiment of the conveyor.

The drawings show a buffer conveyor for conveying and buffering products. Such buffering generally takes place in a production line in which the products are subjected to different processing or treatment steps at different locations and in which temporary differences in the processing rates at these locations must be compensated. The products may consist of containers, for example, in particular containers such as bottles, cans, pots, cartons and the like, but also various other parcel goods, such as cigarettes, boxes, cases or the like are conceivable. In the case of bottles or cartons the processing line will consist of a filling line for filling the containers in question, such as a bottling line for filling the bottles with a beverage. The buffer conveyor may for example be disposed between a depalletising station and a washing and/or filling station, between the filling station and a labelling station or between the labelling station and a packaging station. Other applications are also conceivable, of course.

The illustrated buffer conveyor comprises a frame, in this case provided with a central column 1 with a base 2 and a helical guide chute 3, which extends around the column and which is attached thereto. All kinds of other frame constructions are conceivable, of course. An end roller is mounted to the lower end 4 and the upper end 5 of the guide chute, and a return chute 6 of the frame extends between the ends of the helical guide chute 3. In this embodiment of the buffer conveyor according to the invention, the guide chute 3 and the return chute 6 support a first elongated conveyor 7 and a second elongated conveyor 8, which may for example each be provided with one or more conveyor belts extending beside each other. The conveying portion and the return portion of the two conveyors 7, 8 move along different paths. Is also conceivable to use an embodiment in which the return portion is led along the underside of the guide chute 3 for the conveying portion.

Several embodiments of the first and the second conveyor 7, 8 are possible, as long as a (preferably) more or less closed conveying surface is obtained. Examples of such conveyors are slat conveyors, link conveyors, stainless steel slat chain conveyors, textile belt conveyors, PVC belt conveyors, steel belt conveyors and the like, which latter types are generally only suitable for use in a straight, i.e. non-curved conveyor. The invention also extends to straight conveyors, however, to conveyors which are only curved in a horizontal plane, conveyors which (also) extend in vertical direction and conveyors not configured as endless conveyors, but for example as a roller conveyor or as an air conveyor or a magnetic conveyor.

In the embodiment that is shown in FIG. 1, the helical chute 3 comprises 8 windings, but it is also possible to use a larger or a smaller number of windings, depending on the application in question. For example, the use of guide rollers on the conveyors 7, 8 makes it possible to drive the conveyors over a large number of windings without any driving problem. The two conveyors 7, 8 each have their own drive motor 9, 10, which motors are mounted near the upper end roller 5 in this case, and which drive the associated conveyor belt 7, 8. The two conveyors may also be connected to supply or discharge conveyors and thus be driven and controlled by said conveyors.

Figure 1A:
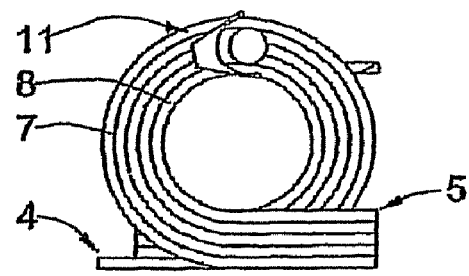
FIGS. 1A, 1B and 1C are smaller-scale top plan views of the buffer conveyor of FIG. 1, which show the variation of the buffering capacity realised by moving a transfer unit.
Figure 1B:
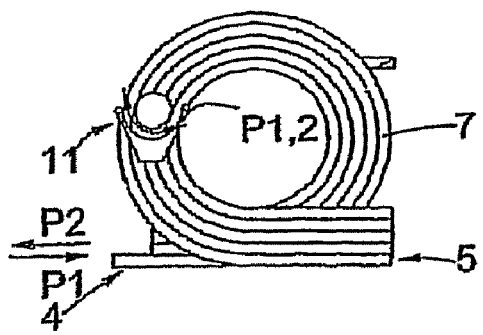
Figure 1C:
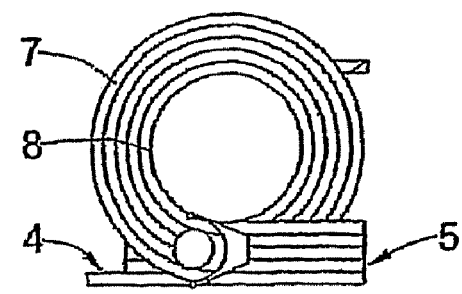

The two conveyors 7, 8 of FIGS. 1A-1C (which each comprise two conveyor belts in the embodiment shown therein) can be driven independently of each other, in this case in opposite directions, i.e. products are conveyed upwards over the conveying surface of the first conveyor belts 7 from a supply end at the lower end 4, as indicated by the arrow P1, and downwards again over the conveying surface of the second conveyor belts 8 (see the arrow P2) towards a discharge end at the lower end 4. At the location indicated by the arrow P1,2 the products are transferred from the conveying surface of the first conveyor belts 7 to the conveying surface of the second conveyor belts 8 by means of a transfer unit 11.

The transfer unit 1 is movable within the buffer conveyor and is guided in the space between the first and the second conveyor. The position of the transfer unit 11 depends on the required buffering capacity between the supply end and the discharge end of the buffer conveyor. If the supply rate of the first conveyor 7 is higher than the discharge rate of the second conveyor 8, the excess of products being supplied must be buffered in the buffer conveyor, and the transfer unit 11 must move away from the supply end of the buffer conveyor in that case so as to collect more products on the buffer conveyor (see FIGS. 1A-1C). If in another case the supply rate of the first conveyor 7 is lower than the discharge rate of the second conveyor 8, the transfer unit 11 must move in the direction of the discharge end so as to supply buffered products to the discharge end. In practice the buffer conveyor is for example capable of buffering a number of products which suffices for 5-15 minutes of buffering time, for example, which period of time generally suffices for restoring the balance between the supply rate and the discharge rate.

The transfer unit 11 is provided with a drive unit for effecting the position change of the transfer unit 11 in the buffer conveyor, which drive unit preferably operates in dependence on the velocities of the first and the second conveyor 7, 8. Said drive unit for the transfer unit 11 comprises a drive motor 12, which follows the movements of the transfer unit at least in part.

FIG. 1D and FIGS. 2-22 to be discussed hereinafter comprise various embodiments of buffer conveyors provided with transfer units 11 that can be driven in various ways.

Figure 1D:
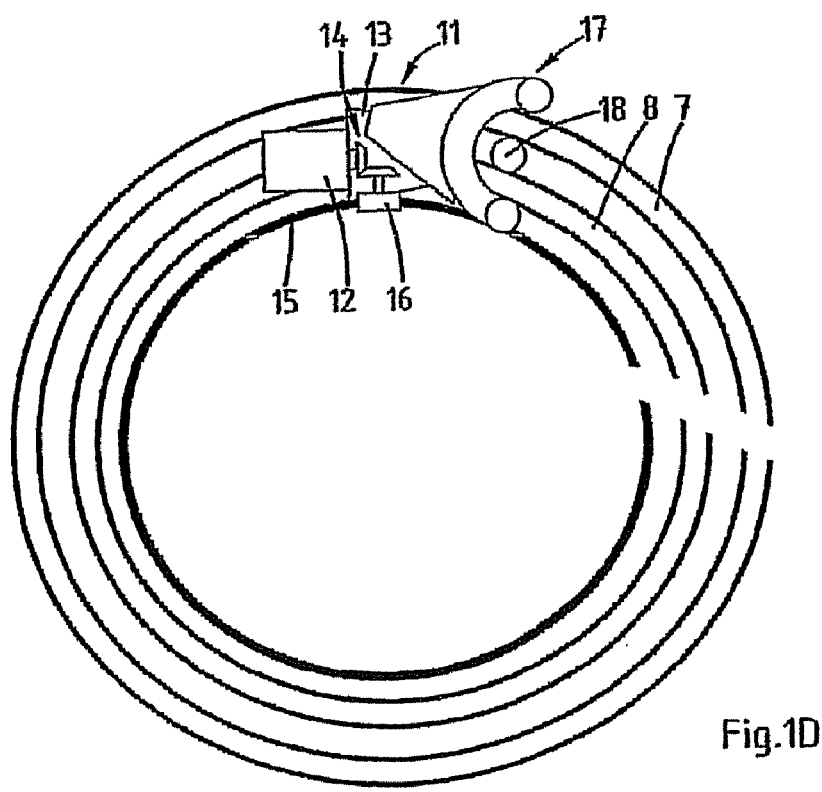
FIG. 1D is a larger-scale view of a winding of the buffer conveyor with a first embodiment of a transfer unit.

FIG. 1D shows a buffer conveyor according to FIG. 1, in which the first conveyor 7, the second conveyor 8 and the transfer unit 11 provided with a drive motor 12 can be distinguished. In this embodiment the drive motor 12 is mounted to a mounting part 13, which is either rigidly or movably connected to the transfer unit 11, depending on the fact whether the curvature of the conveyor belts 7, 8 varies in the path along which the transfer unit can move, for example comprises straight and curved sections. The transfer unit 11 and the mounting part 13 can in that case rotate about an at least substantially vertical axis relative to each other. In this way the drive motor 12 can adapt its position to the shape of the section in which the first and the second conveyor 7, 8 extend parallel to each other in case of a change in the curvature of said section. This is important in particular if the drive motor 12, which may for example consist of an electric motor, is in engagement via the transmission 14 with a stationary part, in this case a ring gear 15 which is in engagement with a pinion 16 of the transmission 14. If the mounting part 13 is capable of movement relative to the transfer unit 11, the location where the pinion 16 engages the ring gear 15 is not critical. In the illustrated case the drive motor 12 has a horizontal axis of rotation, so that the transmission 14 extends perpendicularly to a likewise horizontal, albeit transversely extending axis of rotation of the pinion 16.

It would also be possible to use frictional contact between a wheel and a track extending along the path of the conveyors 7, 8 rather than have the toothed pinion 16 and the ring gear 15 engage each other. The transfer unit 11 comprises a transfer device 17 and a transfer element 18 for transferring the products from the first conveyor 7 to the second conveyor 8. The transfer device 17 in this case comprises a driven belt, which is known per se, for example from the priority document, whose content is considered to be incorporated herein by reference thereto. Also the possible construction of the transfer element 18 is shown in the priority document. The transfer device 17 and the transfer element 18 are capable of transferring the products, which are to that end clamped between these two, from the first conveyor to the second conveyor. There are several other ways of driving the two parts besides the way shown in the priority document, as will be explained in more detail yet with reference to other embodiments.

Figure 2:
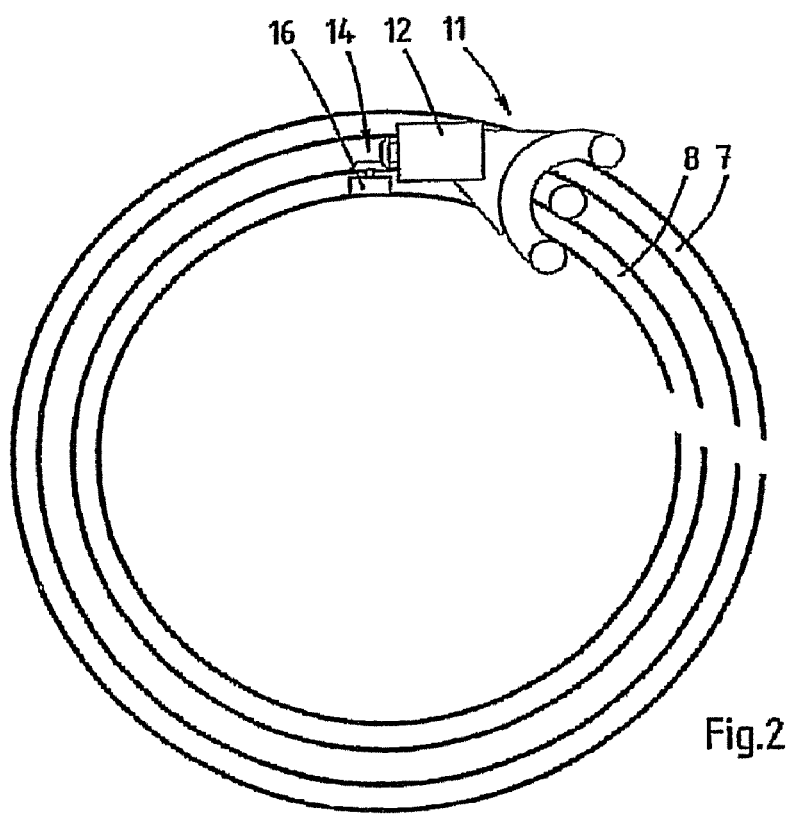
FIGS. 2-22 are schematic plan views corresponding to FIG. 1D of further embodiments of the buffer conveyor.

In the embodiment of FIG. 2, the drive motor 12 is directly rotatably mounted to the transfer unit 11. The pinion 16 of the transmission 14, which may or may not be provided with teeth, is not in engagement with a stationary ring gear or track in this case, but with one of the conveyors 7, 8 (in this case the conveyor 8), so that the movement with respect to one of the conveyors 7, 8 is directly effected.

Figure 3:
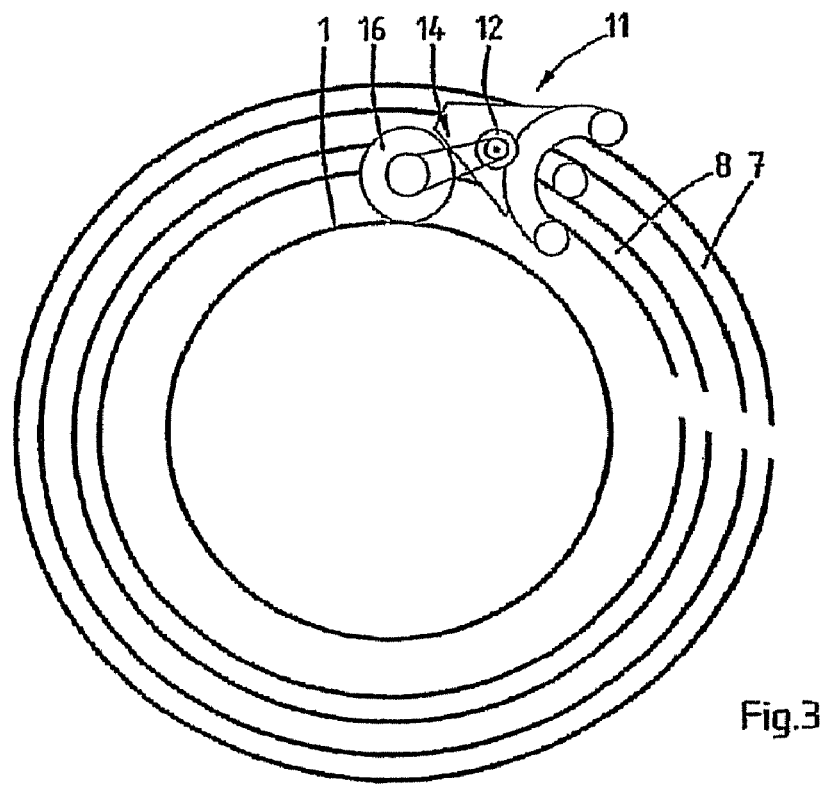

FIG. 3 shows the embodiment in which the drive motor 12 is directly mounted to the transfer unit 11, with its axis of rotation extending at least substantially vertically. The drive motor 12 is drivingly connected, via the transmission 14, which is configured as a drive belt in this case, to a gear or to a friction wheel 16, which is likewise rotatable about an at least substantially vertical axis and which is in engagement with the outer side of the column 1, which has a large diameter in this case.

Figure 4:
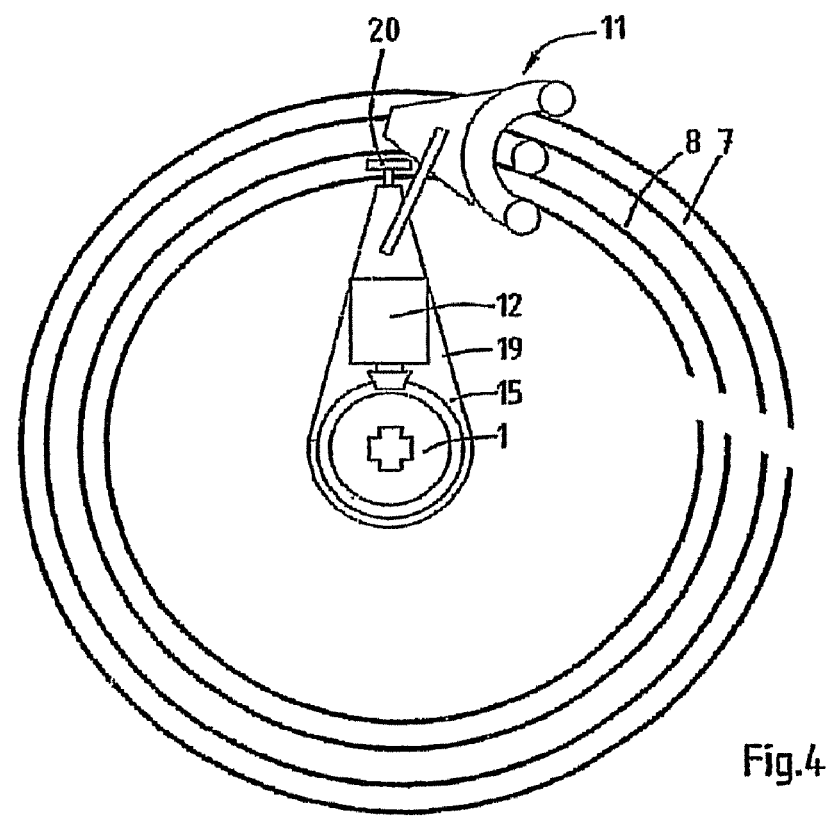

FIGS. 4 and 23 show a variant of the buffer conveyor, in which the transfer unit 11 is driven via an arm 19, which is on the one hand rotatably connected to the column 1 having a cross-shaped cross section with a load bearing bushing 41 and which is drivingly connected to the transfer unit 11 at or near the other end. In the case of a transfer unit 11 that moves in vertical direction, the arm 19 is vertically movable with respect to the column 1, in such a manner that the arm 19 will remain at the same level as the transfer unit 11 during movement thereof along the helical path. The arm 19 can be moved in vertical direction via a separate driving mechanism such as an actuator, for example, in the form of a powered, threaded vertical rod threadably coupled to gear 15 discussed below, but in this embodiment it is moved via a screw formed (in this case) by the helical path of the conveyors 7, 8. The arm 19 is to that end supported on the first conveyor 7 via a wheel 20. The gear 40 on the outgoing shaft of the drive motor 12 is in engagement with a planet gear or ring gear 15, which is connected to the column 1, being locked against rotation but capable of vertical movement with respect thereto due to the engagement of surfaces of a cross-shaped aperture in the planet or ring gear 15 engaging the cross-shaped cross-sectional column 1.

Figure 5:
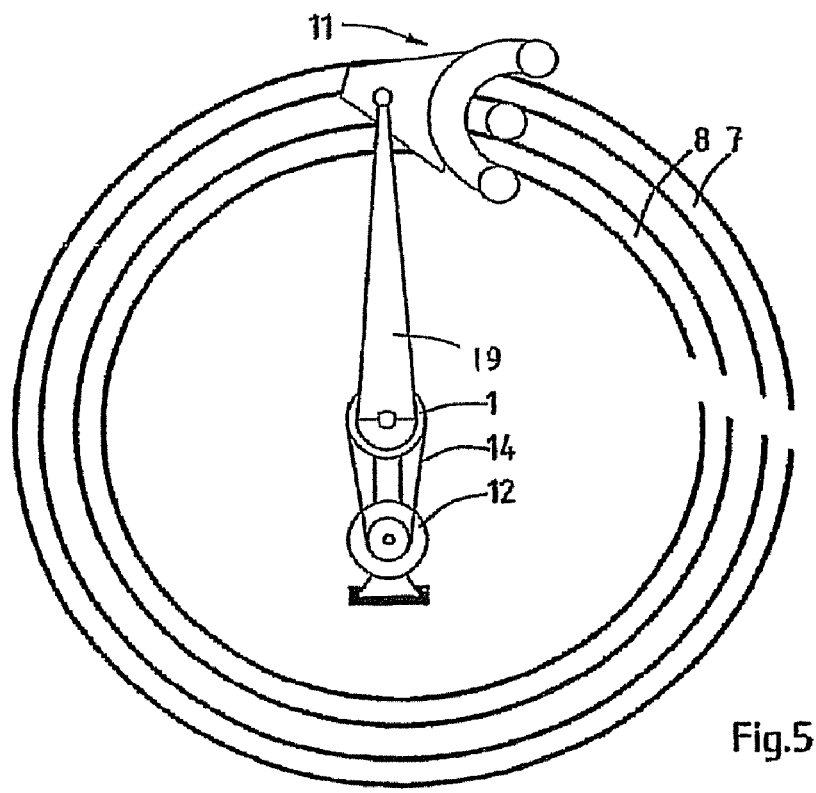

FIGS. 5 and 24 show a variant of the preceding embodiment, in which the drive motor 12 is not mounted on the arm 19 and does not rotate along with the arm 19, either, and is fixedly connected to the column 1, locked against rotation but capable of vertical movement with respect thereto with a mounting bracket 45. A load bearing bushing 46 is connected to the mounting bracket 45 to guide the vertical travel of the mounting bracket 45. The drive motor 12 may to that end be guided in vertical direction via a slide bearing 47, for example, which is connected to the arm 19.

In this embodiment, the transmission 14 includes a pulley and belt mechanism. The arm 19 is rotated by a belt 48 connected to a drive pulley 49 attached to the drive motor 12 and a second pulley 50 rotatably mounted to the column 1 and fixedly attached to the arm 19. As the drive pulley 49 rotates, the belt 48 transfers the force of the motor 12 to the pulley 50 which in turn rotates the arm 19 about the column 1. While a pulley and belt transmission 14 is illustrated, other transmissions 14 are also contemplated including but not limited to a gear system.

Figure 5A:
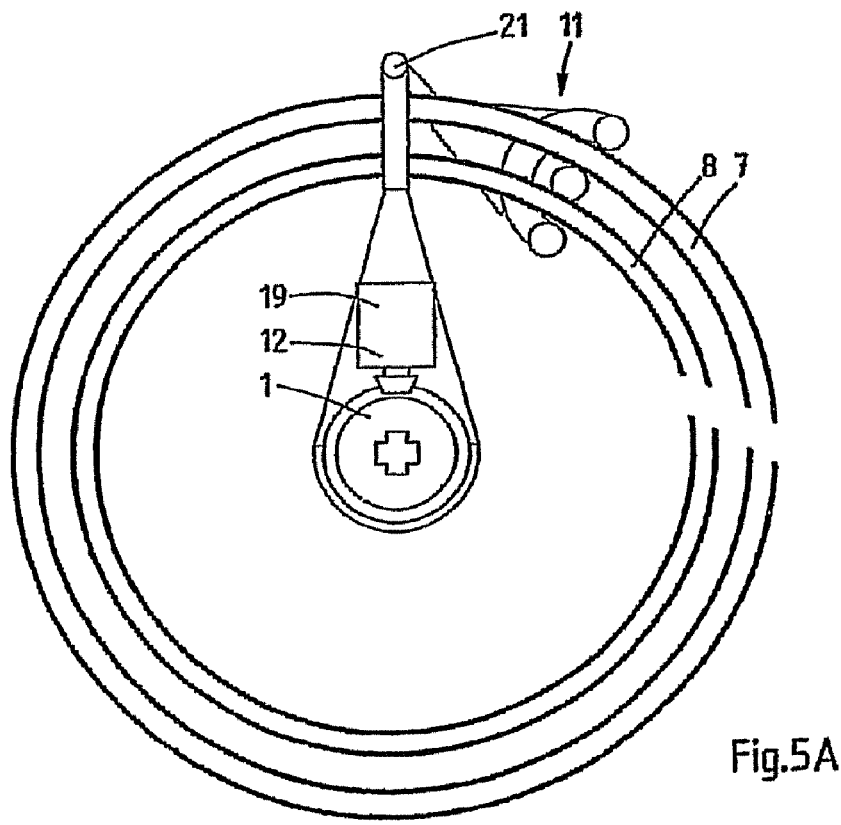

FIGS. 5A and 25 shows another variant of the embodiment of FIG. 4, in which the arm 19 is not vertically movable but extends above the uppermost winding or below the lowermost winding of the helically extending conveyors 7, 8, projecting beyond the outer circumference of the first conveyor 7 (or remaining within the inner circumference of the second conveyor belt 8). The arm 19 and the transfer unit 11 are in this case interconnected via a connecting element 21 which may vary in length between arm 19 and transfer unit 14 so as to compensate for the difference in height between the arm 19 and the transfer unit 11. The position of the drive motor 12 is comparable to that shown in FIG. 4, although in this case the arm 19, and thus the drive motor 11, are only capable of rotary movement and not of translatory movement with respect to the column 1.

The variations illustrated and described in FIGS. 4-5A can be utilised with any of the variants described herein.

Figure 6:
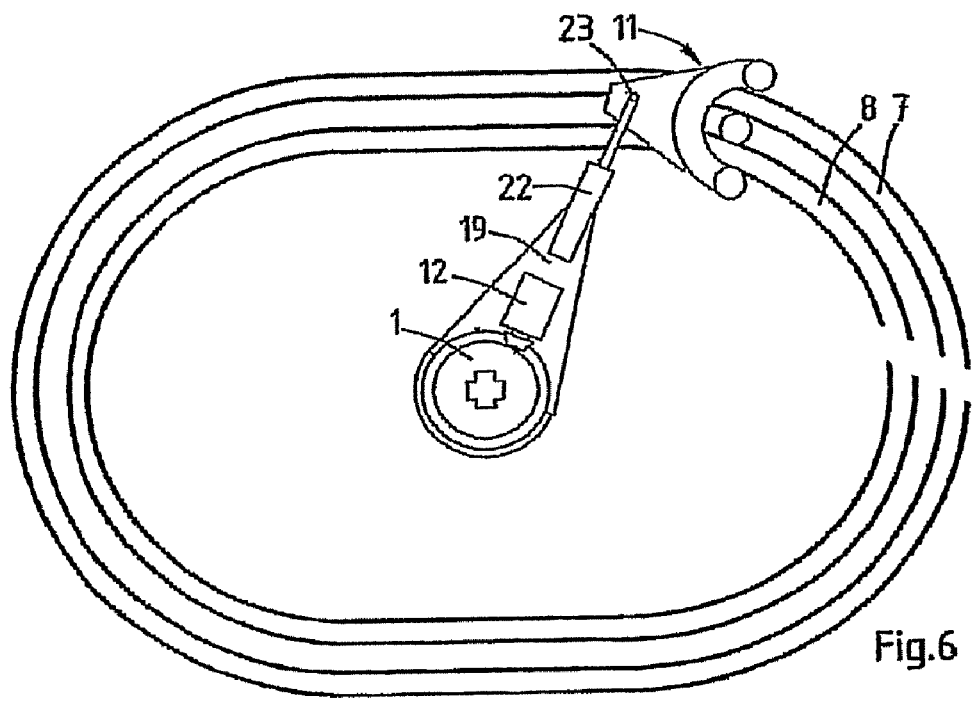

FIG. 6 shows another variant of the embodiment of FIG. 4, in which the conveyors 7 and 8 again extend in a helical path, which does not have a circular but rather an oval base shape, however. This implies in the first place that the curvature of the conveyors 7 and 8 varies along the conveying path, whilst also the horizontal spacing between the transfer unit 11 and the column 1 varies along the length of the conveyor path. The arm 19 is to that end provided with means that enable the arm to adapt itself to the varying spacing between the transfer unit 11 and the column 1, which means comprise a telescopic arm portion 22 in this embodiment. Said telescopic arm portion 22 is connected to the transfer unit 11 in a manner which enables the arm portion 22 and the transfer unit 11 to pivot with respect to each other about an at least substantially vertical axis, for example via a vertical hinge 23.

Figure 7:
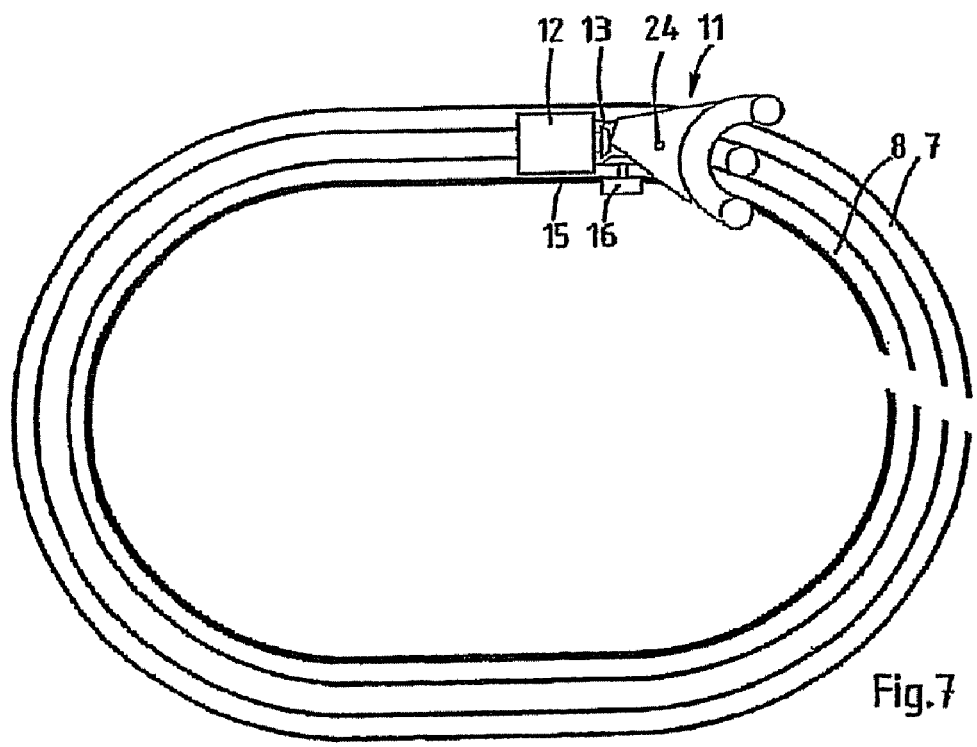

FIG. 7 shows a variant of the embodiment of FIG. 1D, the main difference being the fact that also in this case the helical path has an oval base shape and that the mounting element 13 with the drive motor 12 mounted thereon is connected to the transfer unit 11 via an at least substantially vertical hinge 24.

Figure 8:
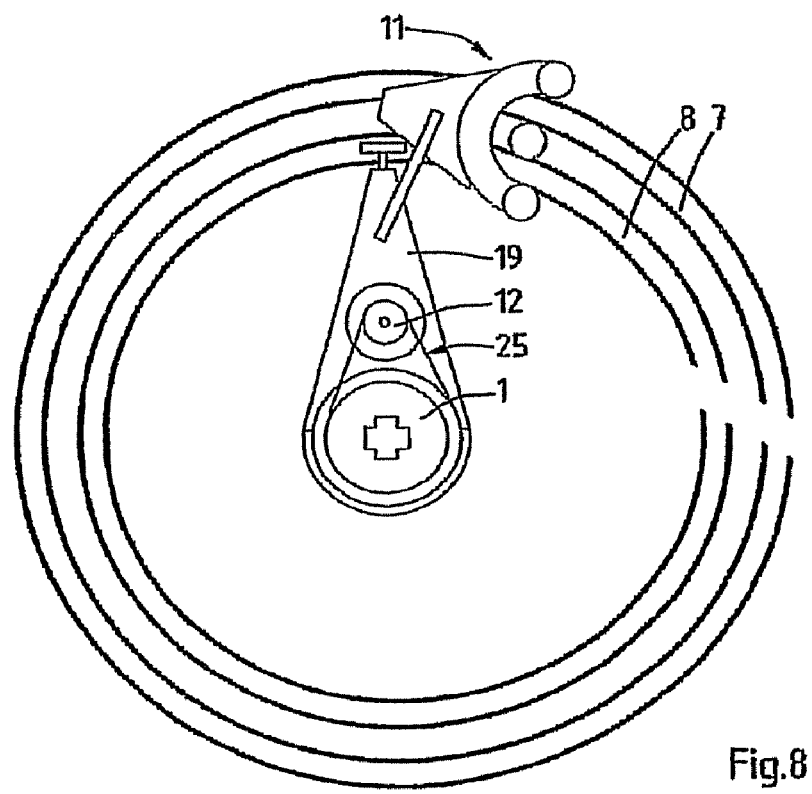

FIG. 8 shows another variant of the embodiment of FIG. 4, in which the drive motor 12 is mounted on the arm 19 in such a manner that the axis of rotation of the drive motor extends vertically, with the drive motor 12 being connected to the column 1 via a drive belt 25 and a pulley. Said pulley is in turn connected to the column 1, being locked against rotation but being vertically adjustable with respect thereto.

Figure 9:
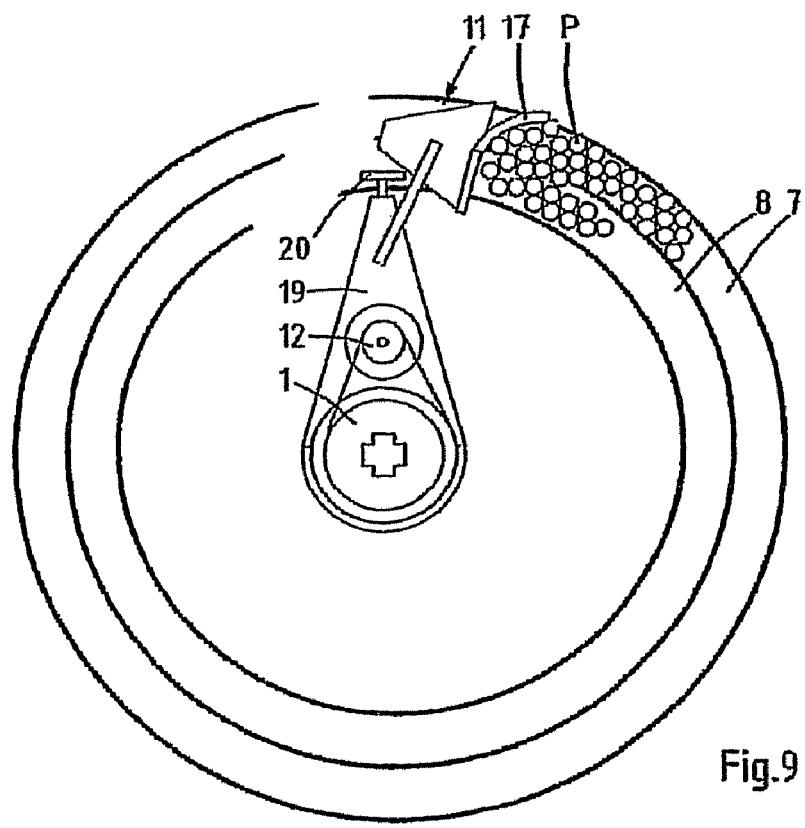

FIG. 9 shows a variant of the embodiment of FIG. 8, in which the transfer unit 11 has been adapted for transferring products P being conveyed in a mass flow. Products having a circular section are concerned in this case, such as bottles, pots or the like. In this case there is hardly any gap between the first and the second conveyor 7, 8 (which may also each consist of a number of side-by-side conveyor belts), so that the products can be directly transferred from the first conveyor 7 to the second conveyor 8. The transfer device 17 of the transfer unit 11 may consist of a simple, non-movable guide, which functions to transfer products that come into contact with the guide of the transfer element 18 in lateral direction to the second conveyor 8. The guide of the transfer device 17 may also be moved in that case to help effect said transfer.

Figure 10:
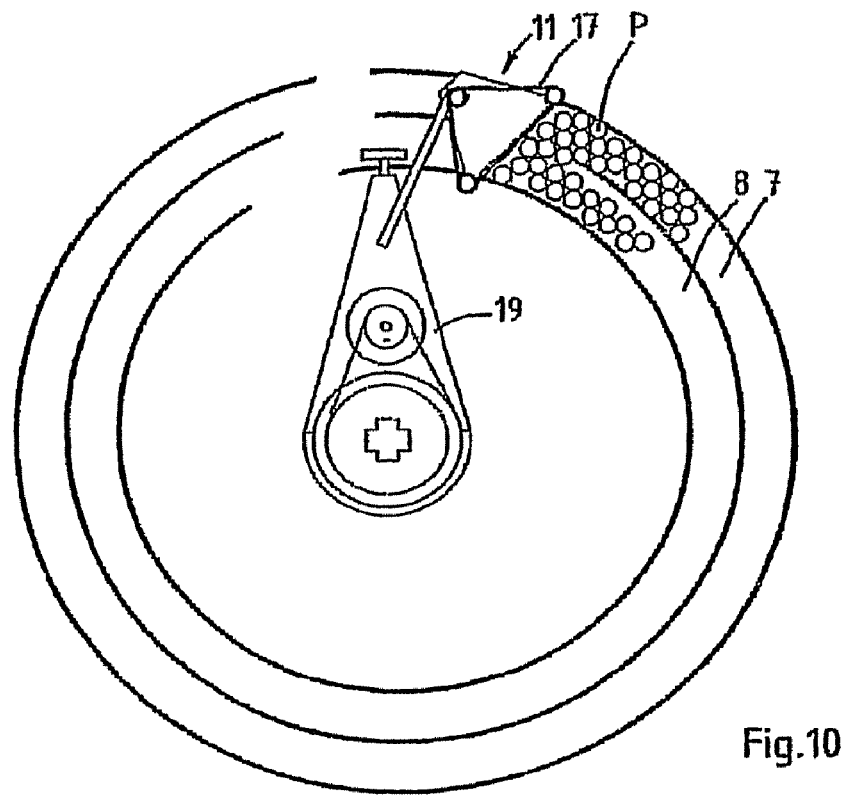

FIG. 10 shows a variant comprising a movable transfer device 17 in the form of a circulating transfer belt moving from the first conveyor 7 to the second conveyor 8 on the side that faces towards the products.

Figure 11:
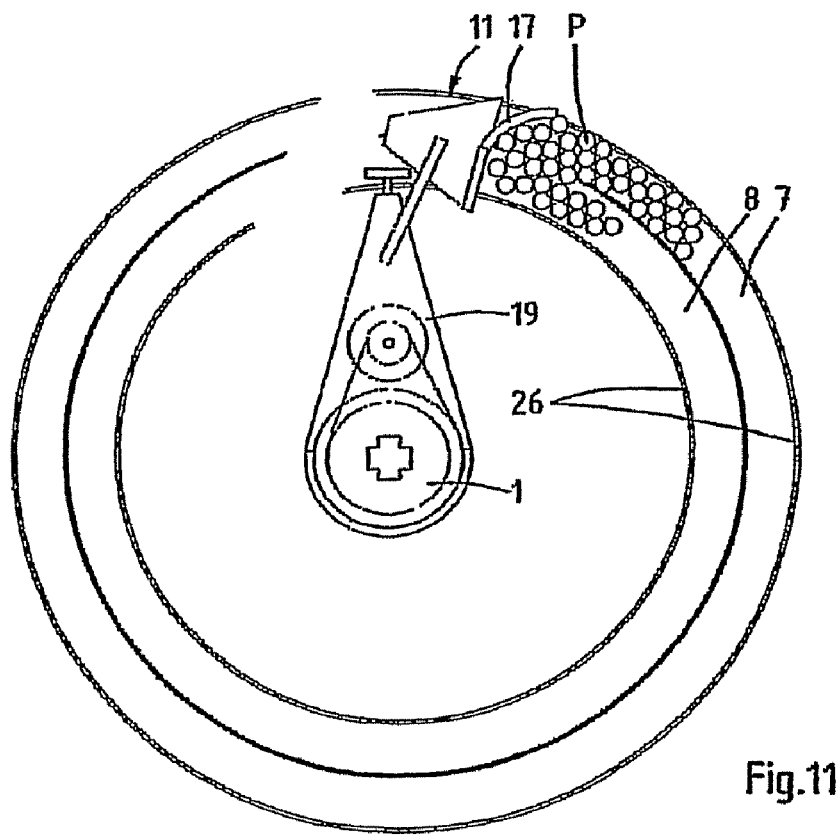

FIG. 11 shows a variant of the embodiment of FIG. 9, in which a guide 26 is mounted to the conveyors 7, 8, thus moving along therewith, at the radial outer side and at the radial inner side, respectively, thereof for guiding the products.

Figure 12:
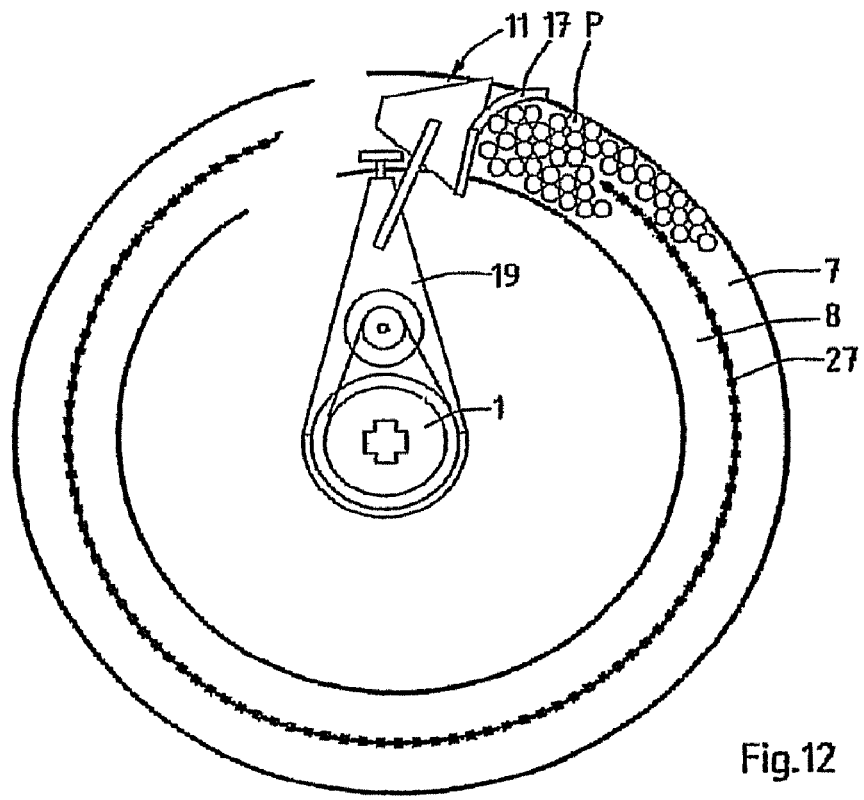

FIGS. 12, 26 and 27 shows another variant of the embodiment of FIG. 9, in which a center guide 27 extending parallel to the first conveyor 7 and the second conveyor 8 is provided between said conveyors. Said center guide 27 follows the movements of the transfer unit 11 which is driven by the drive motor 12 which is fixedly mounted to the arm 19. The arm 19 is rotatably mounted to the column 1 where the movement of the arm 19 is guided by a bearing 47. A belt 48 engages both a drive pulley 49 and a pulley 50 non-rotatably attached to the column 1. As the wheel 20 moves on the helical conveyor 8, both the arm 19 and the pulley 50 vertically move on the column 1.

The center guide 27 is coupled to the transfer unit 11 or driven synchronously with the transfer unit 11. The end of the center guide 27 facing towards the transfer device 17 is spaced a fixed distance therefrom, so that the products P present in the space between the center guide 27 and the transfer device 17 can be transferred from the first conveyor 7 to the second conveyor 8. The center guide 27 may be arranged in a small gap between the conveyors 7 and 8 or be suspended from a guide mounted above the conveyor belts 7 and 8. A length of the center guide 27 ranges from about 1 meter to between about 1 and 1.5 windings long.

Referring to FIG. 27, the center guide 27 is slidably supported by a pair of rails 51 where the center guide may include a number of interconnected slats including a top plate 52 and bottom hooks 53 engaging below the rails 51 such that the guide is slidably retained between the rails 51. The conveyors 7 and 8 may also be formed from a large number of interconnected slats supported between spaced apart rails 54 and 55, respectively, where the slats of conveyors 7 and 8 each include a top plate 56 and bottom hooks 57, respectively, which slidably retains the conveyors 7 and 8 to the spaced apart rails. The conveyors 7, 8 and the slats of the center guide 27 may have the same configuration as shown in FIG. 4 or 5 of inventor's U.S. Pat. No. 6,336,551, the content of which is incorporated herein by reference thereto. As in this US patent, rollers may be used to convert a sliding movement into a rolling movement. This also applies to the vertical support of the slats.

Figure 13:
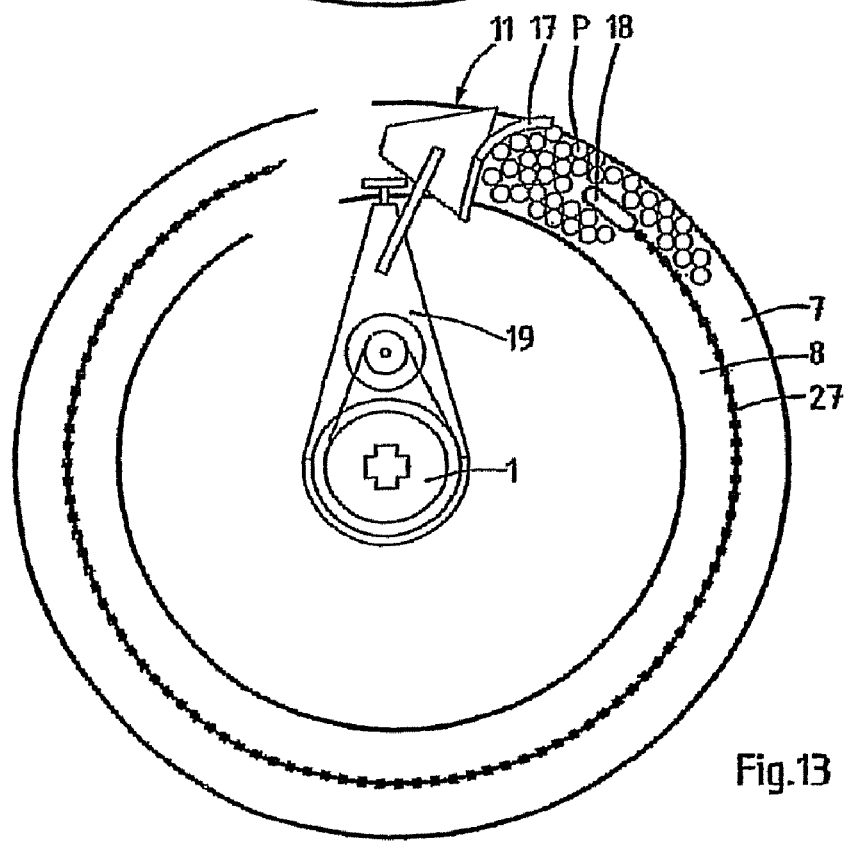

In the variant that is shown in FIG. 13, a transfer element 18 is attached to the end of the center guide 27 that faces towards the transfer device 17. Said active transfer device 17 functions to help transfer the products P. The transfer element 18 may to that end be rotatable about one or more vertical axes, so that a kind of propeller is obtained, which actively transfers the products, but also an eccentrically reciprocating movement of the transfer element 18 is conceivable (a so-called "wagging unit"). Further variants are possible.

Figure 14:
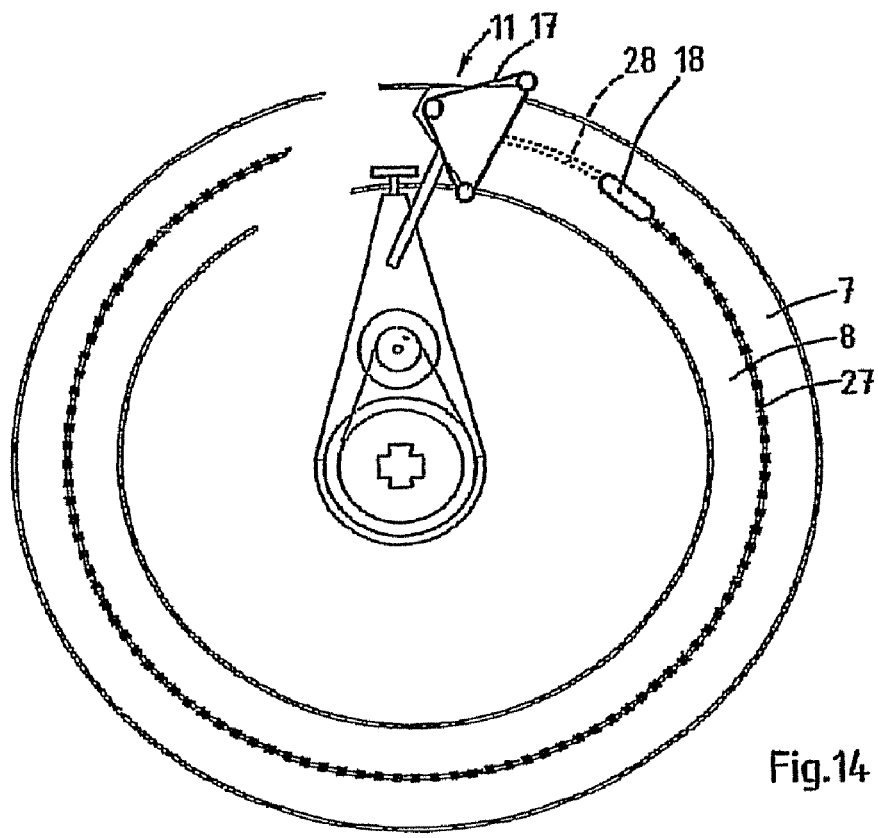

In the variant that is shown in FIG. 14, the center guide 27 provided with the transfer element 18, which may or may not be an active element, is combined with an active, in this case circulating transfer device 17. In this variant the center guide 27 is arranged between the first conveyor 7 and the second conveyor 8, and the gap thus formed is provided with a flexible bridge element at the area between the transfer device 17 and the transfer element 18, the upper surface of which bridge element lies in the same plane as the conveying surface of the first and the second conveyor 7, 8, so that the products can be transferred from the first conveyor 7 to the second conveyor 8 via the flexible bridge element 28. The bridge element 28 may be integral with the center guide 27 or consist of a separate element, which is connected either to the transfer unit 11 or to the center guide 27 for following the movements of the transfer unit 11 at least along part of the conveyor path.

Figure 15:
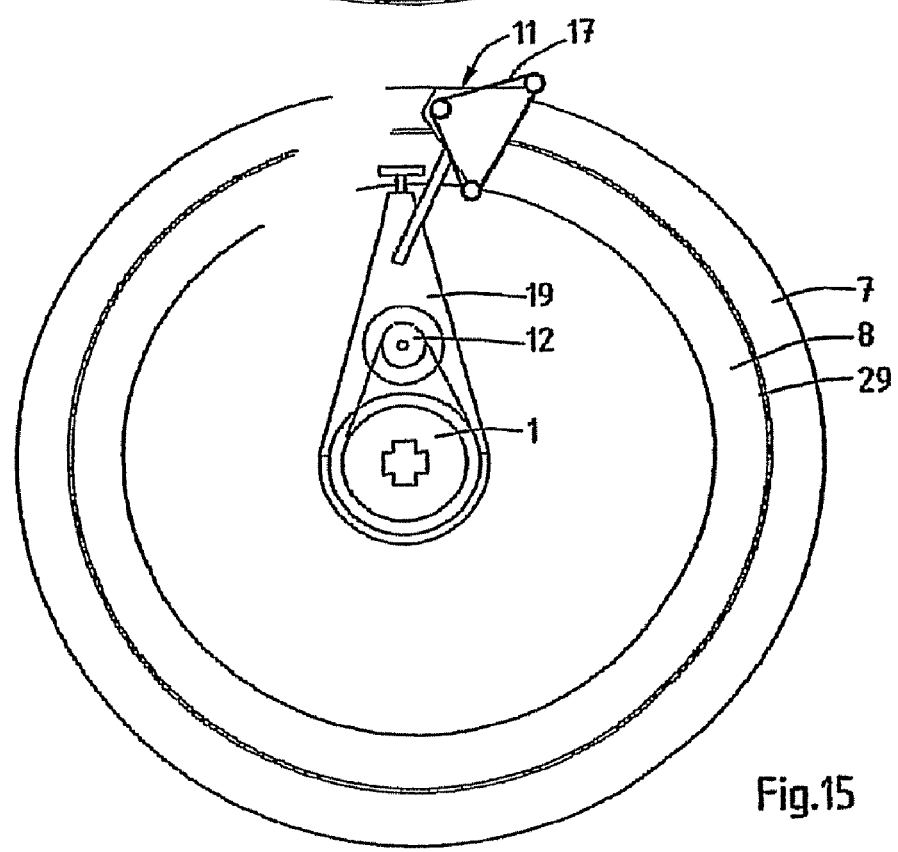

FIG. 15 shows a variant of the embodiment shown in FIG. 10, in which the first conveyor 7 and the second conveyor 8 are spaced apart by a small distance and in which a stationary bridge element 29 is disposed in the small gap between the conveyors, which bridge element extends along at least part of the conveyor path, parallel thereto. The surface of the bridge element 29 in turn lies in at least substantially the same plane as the conveying surface of the conveyors 7 and 8. In this case the products present near the transfer unit 11 move from the first conveyor 7 to the second conveyor 8 via the stationary bridge element 29.

Figure 16:
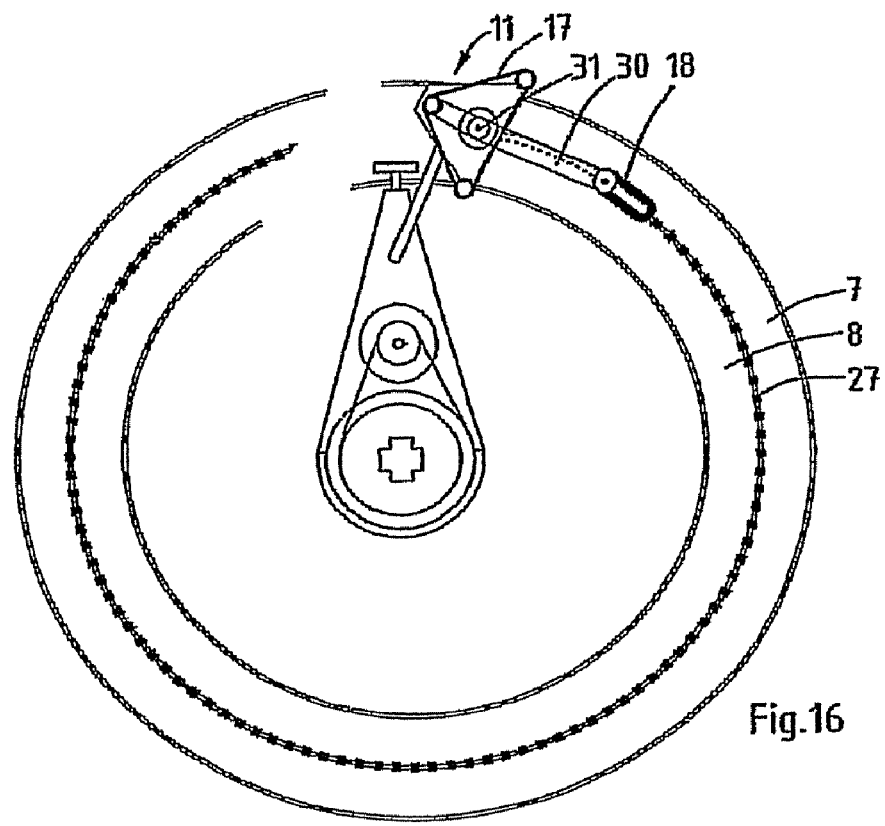

FIG. 16 is a view of a variant of the embodiment shown in FIG. 14, which shows the manner in which the active transfer element 18 can be driven. In this case the transfer element 18 is driven by drive means 31 via a drive belt 30. Said drive means 31 may be a drive motor or be connected to the two conveyors 7, 8, for example via a differential, for being driven in dependence on the difference in velocity between the first and the second conveyor 7, 8. The drive means 31 may also be driven by one of the conveyors 7, 8. The drive means 31 is also used for driving the transfer device 17.

Figure 17:
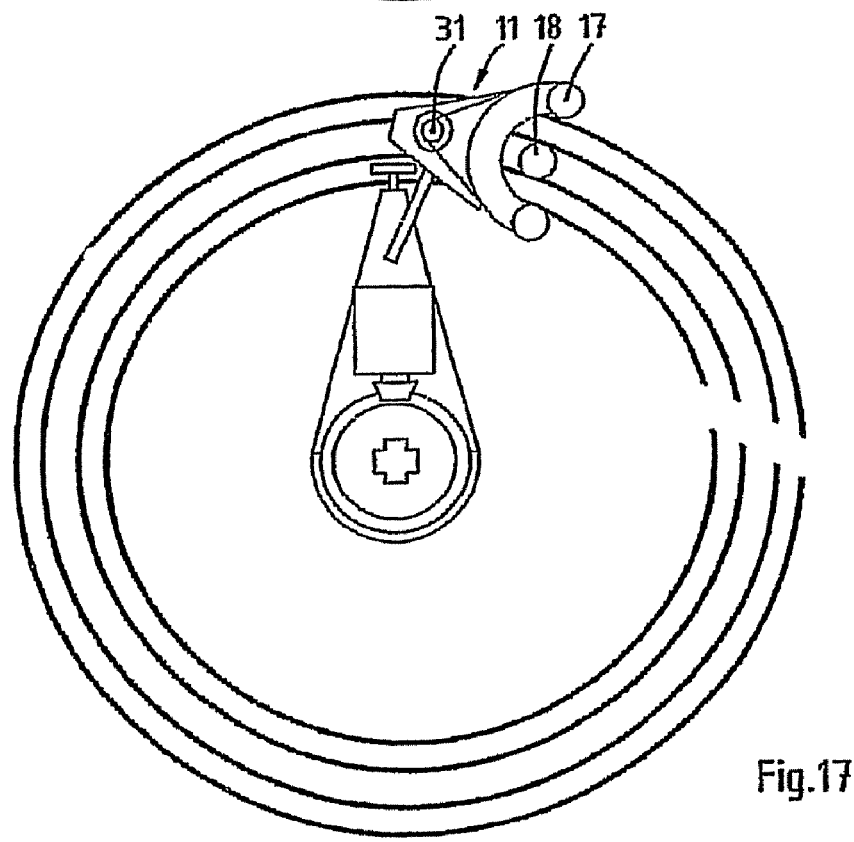

FIG. 17 is a view of an embodiment corresponding to the embodiment of FIG. 4, in which the means 31 for driving the transfer device 17 is shown. The transfer belt of the transfer device 17 is to that end passed over the drive means 31.

Figure 18:
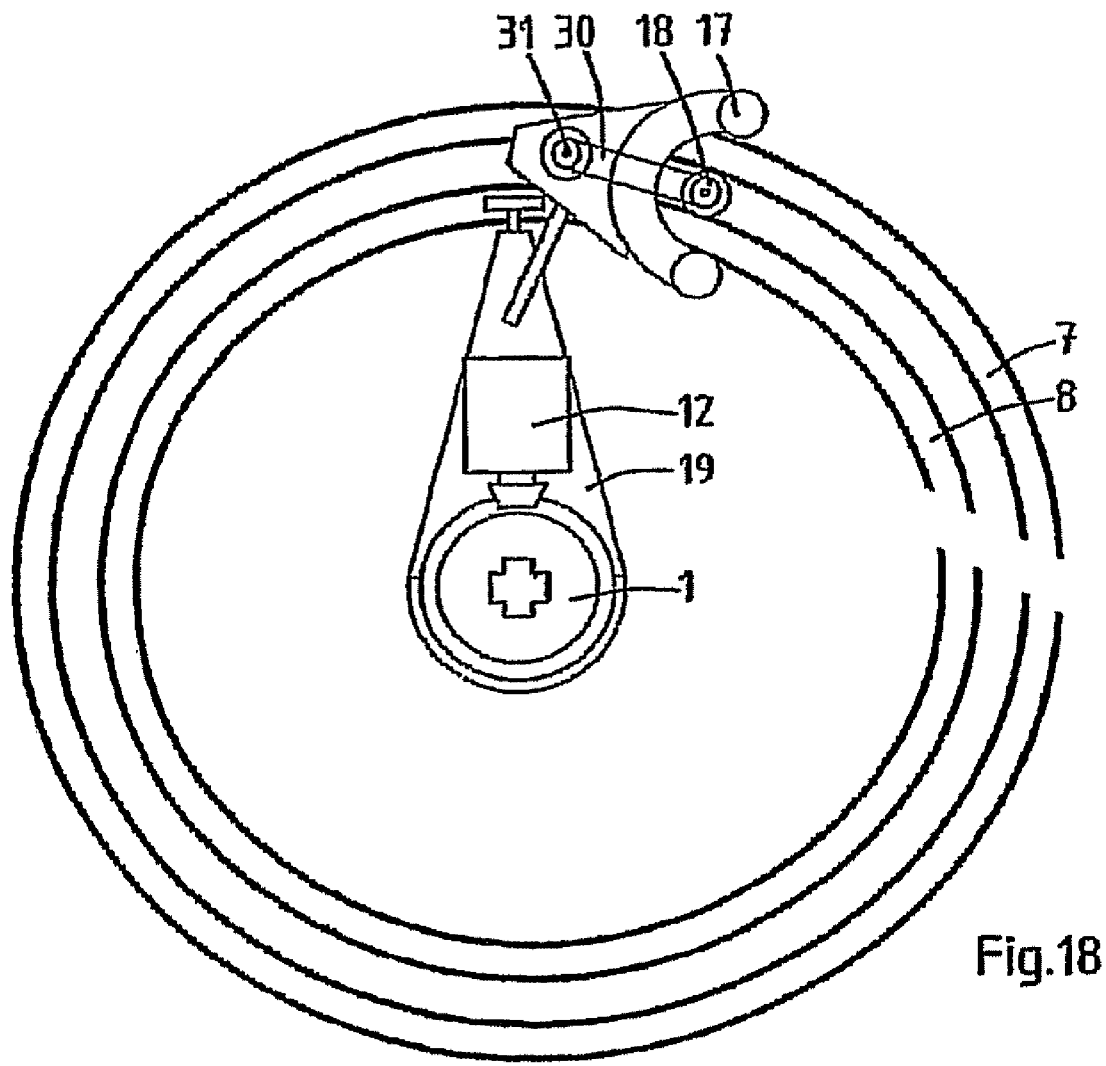

FIG. 18 shows that in this embodiment the drive means 31 can also be used for driving the transfer element 18 disposed opposite the transfer device 17.

Figure 19:
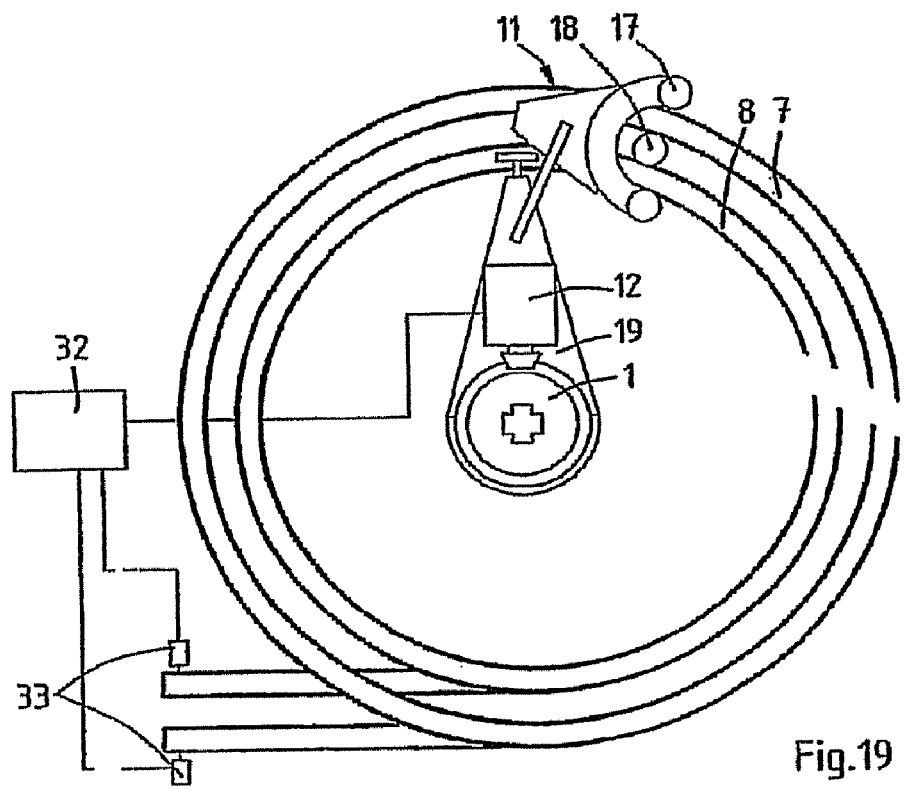

FIG. 19 shows the manner in which the drive motor 12 for the transfer unit 11 can be controlled. FIG. 19 shows a control unit 32 which is on the one hand connected to the drive motor 12 and which is on the other hand connected to sensors 33 that determine the velocities of the first and the second conveyor 7, 8, directly at the conveyor belts thereof or via the driving gear thereof. Based on the detections made by the sensors 33, the control unit calculates the required speed for the drive motor 12. This takes place on the basis of a formula in which the difference in velocity between the first conveyor 7 and the second conveyor 8 and possibly a (varying) factor play a part.

Figure 20:
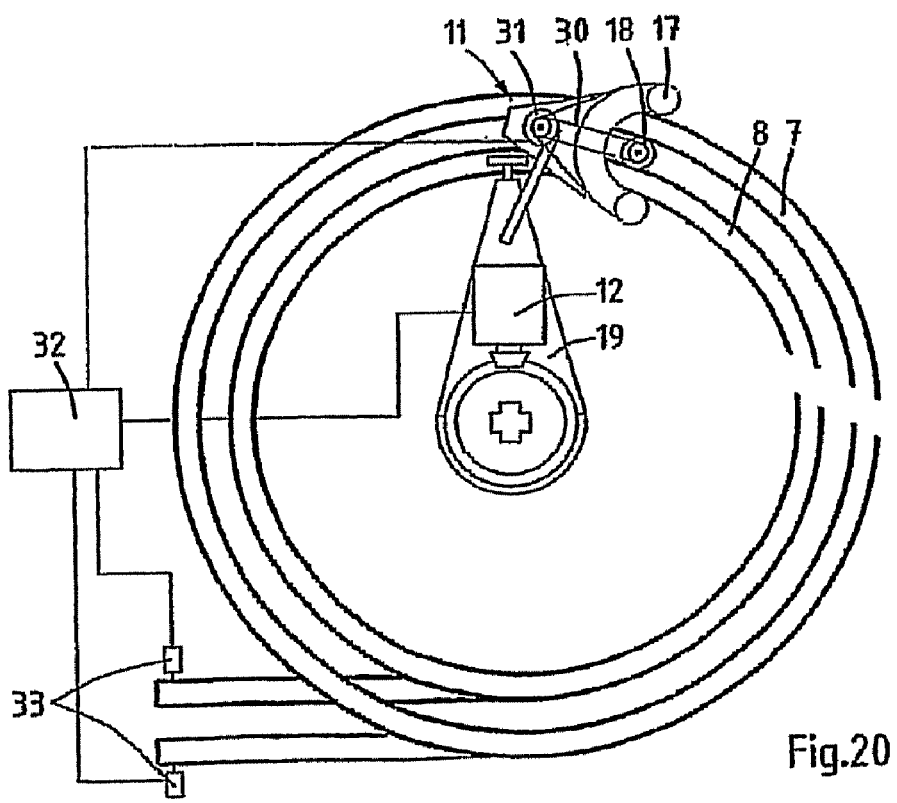

As shown in FIG. 20, the control unit 34 may also be connected to the drive means 31, a drive motor in this case, for the transfer device 17 and the transfer element 18. Said drive means 31, too, may be controlled on the basis of the information obtained from the sensors 33. To connect the drive motors 12 and 31 to an associated energy source, in particular the electricity mains, use may be made of sliding contacts which extend substantially parallel to the path of the conveyors 7, 8, but it is also possible to make use of a rotary connection, with the cables extending from the column 1 to the drive motors 12, 13, for example. The connection between the control unit 32 and the drive motors 12 and 31 may take place in the same manner or, for example, via a radio signal or through induction.

Figure 20A:
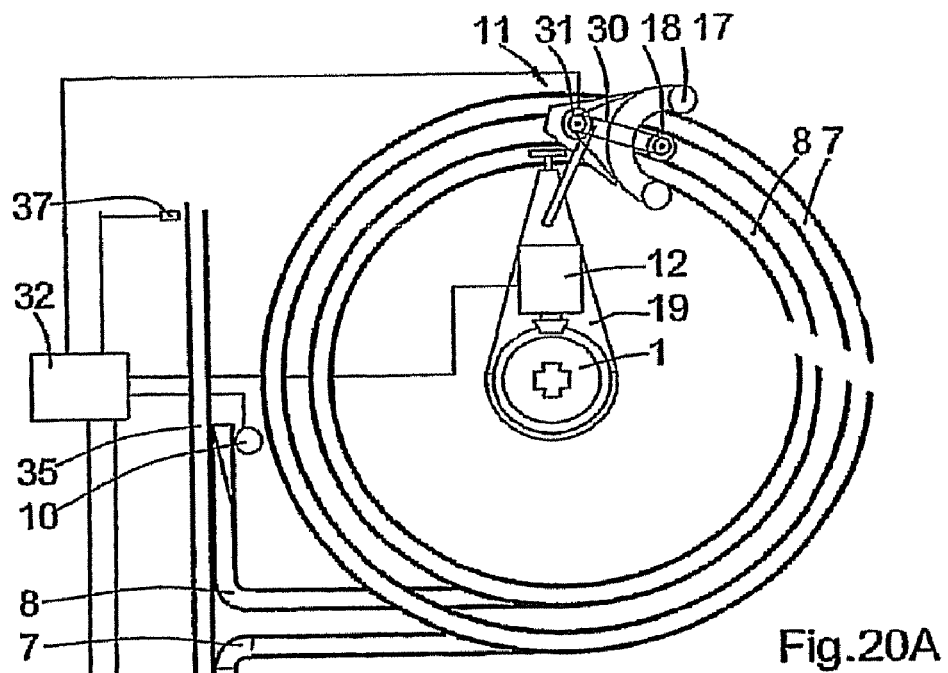

FIG. 20a shows an embodiment in which the first and the second conveyor are connected to a supply conveyor 34 and a discharge conveyor 35, which are integrated in this embodiment. Sensors 36 and 37 measure the amount of products present on the supply conveyor 34 and the discharge conveyor 35 (no supply or discharge, enough supply or discharge or too much supply or discharge) and the control unit 32 controls the drive motors 9 and 10 of the first and the second conveyor 7, 8, the drive motor 12 of the transfer unit 11 and/or the drive means 31 of the transfer device 17 (partially) on the basis of the measurement data.

Figure 20B:
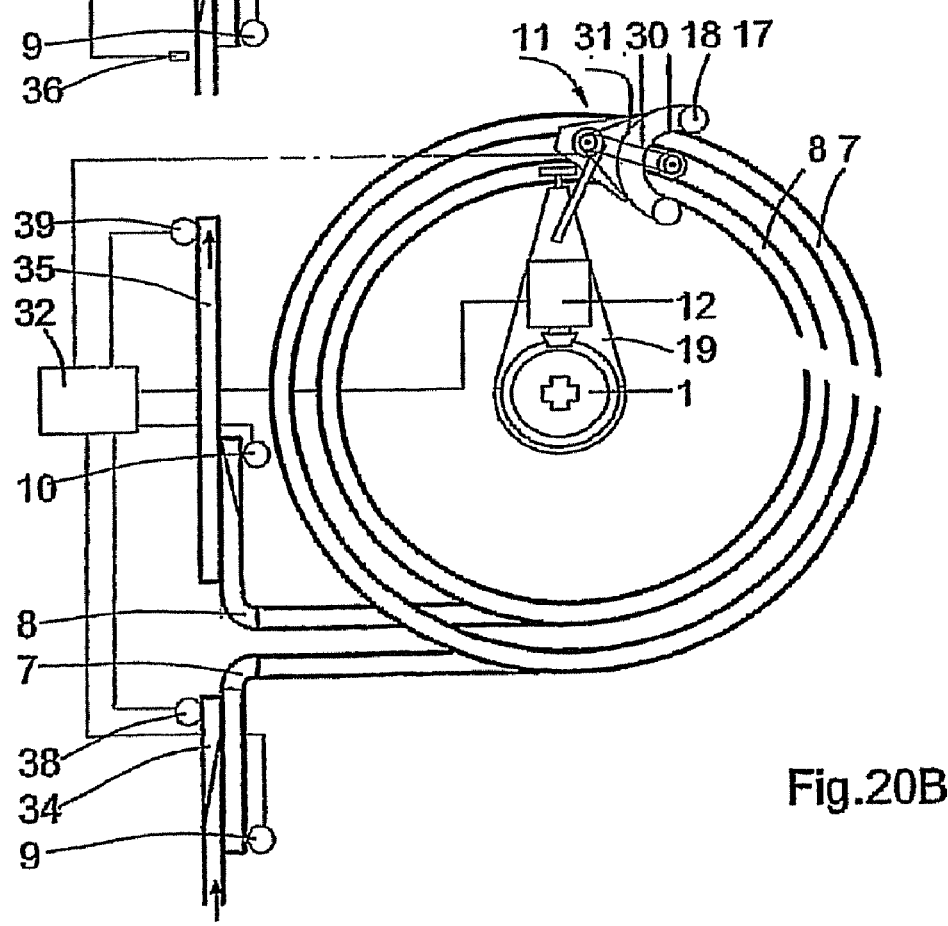

In FIG. 20b the supply conveyor 34 and the discharge conveyor 35 are not connected, and the control unit 32 also controls motors 38 and 39 of the supply conveyor and the discharge conveyor, optimally gearing the various conveying links in the system to each other so as to tune the transportation to the preceding or next, likewise monitored processing or treatment processes in the line.

Figure 21:
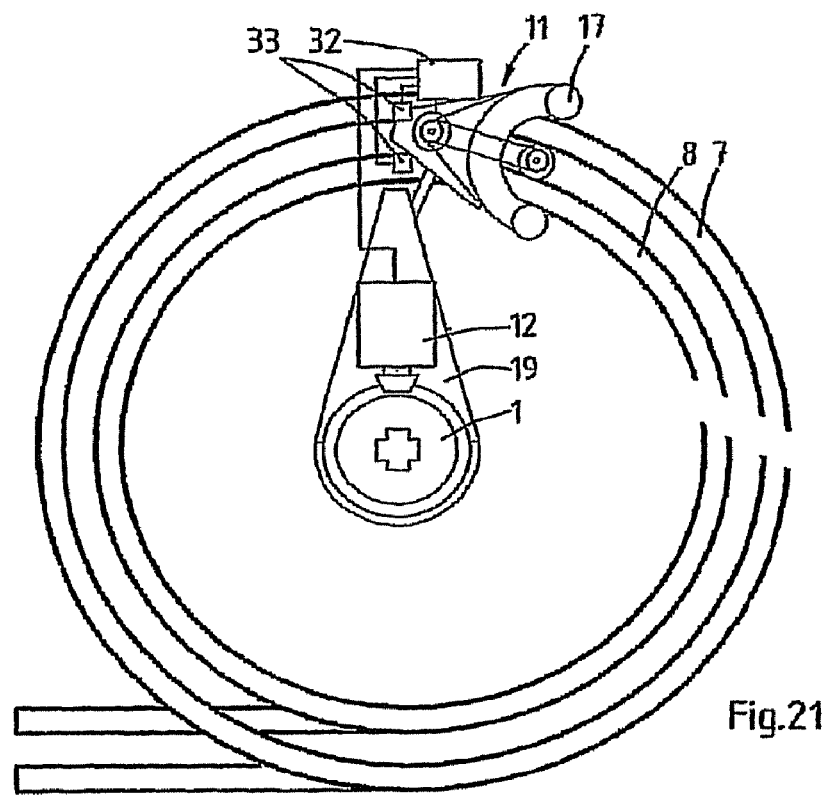

In the variant that is shown in FIG. 21, the control unit 32 and the sensors 33 are mounted on or to the transfer unit 11, so that the communication and the connections are significantly simplified. If the energy source is mounted to the transfer unit 11 as well, for example in the form of a battery, the transfer unit 11 can function independently. In this case the sensors 33 do not measure the absolute velocity of the conveyors 7, 8, but the velocity thereof in relation to the transfer unit 11, and the required velocity of the transfer unit 11 can be calculated on the basis of said measurement.

Figure 22:
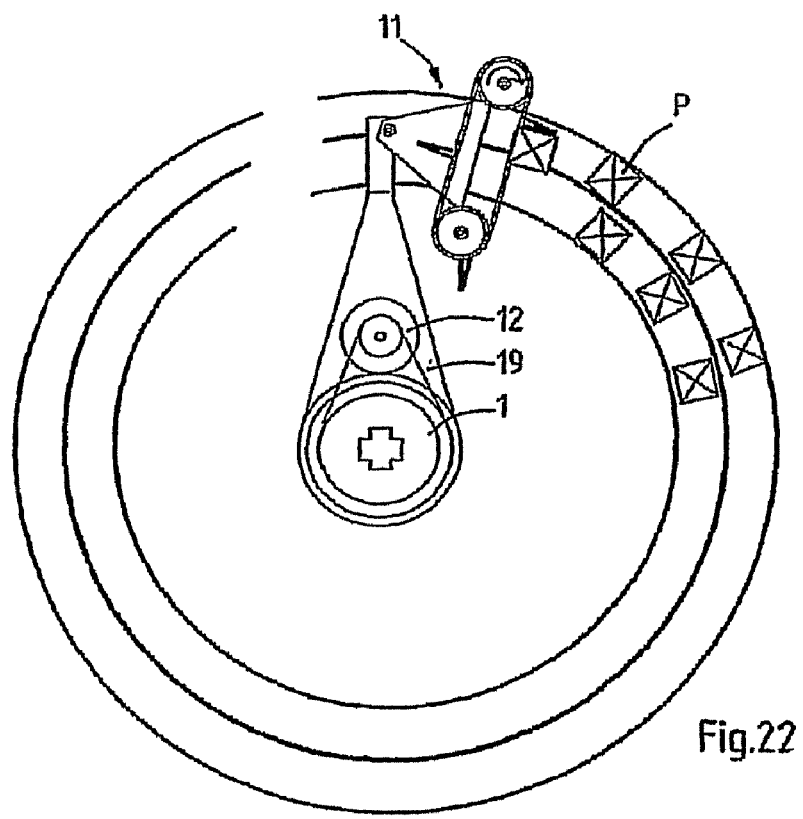

FIG. 22 shows another variant of the transfer unit 11, which is in particular intended for transferring products P which are large, for example, or which, because of their shape, cannot be moved by the continuously circulated transfer unit. In the illustrated embodiment a "flap belt" pusher is used as the transfer device 17, but it is also possible to use a rod pusher or the like. In both cases the transfer device 17 makes a discontinuous stroke, and such a stroke is only made if the sensor detects the presence of a product near the transfer device 17. The transfer device 17 will then make a transferring movement, and in the illustrated embodiment, which makes use of a circulating belt for moving the pushers, the transfer device will directly be ready for transferring a next product P. The stroke of the transfer device may also be initiated by a computer calculation as known from tracing systems.

From the foregoing it will be apparent that the invention provides a buffer conveyor which can be embodied in a variety of ways and which provides a versatile manner of transferring products. The drive of the transfer unit can be readily adapted to the application in question. The various embodiments may be combined, if desired, so that specific features of one embodiment can also be integrated in another embodiment.

What is claimed is:

1. A buffer conveyor for conveying and buffering products, comprising:
    a frame,
    at least one first elongated conveyor supported by the frame, which is driven in a first direction and which has a supply end,
    a second elongated conveyor supported by the frame, which is driven in a second, opposite direction and which has a discharge end, which first and second conveyors extend at least substantially parallel to each other,
    a transfer unit movable adjacent the first and second elongated conveyors, the transfer unit having a transfer device configured to transfer the products from the first conveyor to the second conveyor and a drive unit configured to move the transfer unit relative to the frame, wherein the drive unit comprises a drive motor providing power to move the transfer unit using a source of energy not due to movement of the conveyors, and wherein a position of the drive motor moves relative to the frame at least partly when the transfer unit moves relative to the frame.

2. The buffer conveyor according to claim 1, wherein the drive motor is mounted to a mounting element that moves along with the transfer unit.

3. The buffer conveyor according to claim 2, wherein the mounting element is mounted on or to the transfer unit.

4. The buffer conveyor according to claim 1, wherein the drive unit comprises a transmission which is in driving engagement with the drive motor on the one hand and with either the frame or the first and/or the second conveyor on the other hand.

5. The buffer conveyor according to claim 1, wherein the first and second elongated conveyors wind around a vertical column of the frame, and the buffer conveyor further comprises a support rotationally connected to the column so as to rotate at least partially about the vertical column, and wherein the support extends away from the vertical column is connected to the transfer unit.

6. The buffer conveyor according to claim 5, the support comprises an arm, and wherein the drive motor is mounted on said arm, and the drive unit comprises a transmission operably coupled to the drive motor and the column to drive the arm at least partially about the column.

7. The buffer conveyor according to claim 6, wherein the first and second elongated conveyors extend non-concentrically relative to the column, and wherein the arm is configured to adapt a length thereof to the varying distance between the transfer unit and the column.

8. The buffer conveyor according to claim 1, wherein the first and second elongated conveyors extend are curved at least in the horizontal plane also extends at least partially in vertical direction.

9. The buffer conveyor according to claim 8, wherein the first and second elongated conveyors extend are spirally or helically curved.

10. The buffer conveyor according to claim 8, wherein the first and second elongated conveyors include curvatures that vary along their length.

11. The buffer conveyor according to claim 1, wherein the first and second elongated conveyors extend in a vertical direction and wherein the drive motor is connected to the transfer unit in such a manner that it follows the vertical movement of the transfer unit.

12. The buffer conveyor according to claim 1, wherein the first and second conveyor extend with a horizontal gap between them, and wherein the transfer unit is guided on a guide in said gap, in such a manner that the products are transferred from the first conveyor to the second conveyor via said transfer unit.

13. The buffer conveyor according to claim 1, wherein the first and the second conveyor extend substantially without a gap between them, in such a manner that the products are transferred directly from the first conveyor to the second conveyor by the transfer unit.

14. The buffer conveyor according to claim 13, wherein a center guide is provided between or above the transition between the first and the second conveyor, which center guide is linked to the movement of the transfer unit and which terminates at a point some distance away from the transfer device of the transfer unit.

15. The buffer conveyor according to claim 14 wherein a transfer element is mounted to the end of the center guide that faces in the direction of the transfer device of the transfer unit, which transfer element is driven for the purpose of transferring products from the first conveyor to the second conveyor.

16. The buffer conveyor according to claim 1, wherein the transfer device is driven by a drive mounted to the transfer unit.

17. The buffer conveyor according to claim 15, wherein the transfer element and the transfer device are driven by the same drive.

* * * * *